(12) United States Patent
Conrad et al.

(10) Patent No.: US 7,724,890 B1
(45) Date of Patent: May 25, 2010

(54) FOCUSED RETRIEVAL OF SELECTED DATA IN A CALL CENTER ENVIRONMENT

(75) Inventors: Peter Conrad, Leimen (DE); Hardy Berendt, Enkenbach-Alsenborn (DE)

(73) Assignee: SAP AG, Walldorf (DE)

( * ) Notice: Subject to any disclaimer, the term of this patent is extended or adjusted under 35 U.S.C. 154(b) by 1248 days.

(21) Appl. No.: 11/220,449

(22) Filed: Sep. 7, 2005

(51) Int. Cl.
H04M 3/00 (2006.01)
(52) U.S. Cl. ............... 379/266.1; 379/267; 379/265.09; 379/142.06
(58) Field of Classification Search ............ 379/265.01, 379/265.09, 266.1, 267, 142.01, 142.04, 379/142.06
See application file for complete search history.

(56) References Cited

U.S. PATENT DOCUMENTS

| | | | |
|---|---|---|---|
| 4,752,877 A | | 6/1988 | Roberts et al. |
| 5,315,508 A | | 5/1994 | Bain et al. |
| 5,400,253 A | | 3/1995 | O'Connor |
| 5,615,109 A | | 3/1997 | Eder |
| 5,675,637 A | * | 10/1997 | Szlam et al. ............ 379/142.17 |
| 5,758,327 A | | 5/1998 | Gardner et al. |
| 5,870,716 A | | 2/1999 | Sugiyama et al. |
| 5,930,769 A | | 7/1999 | Rose |
| 5,930,771 A | | 7/1999 | Stapp |
| 5,999,914 A | | 12/1999 | Blinn et al. |
| 6,029,139 A | | 2/2000 | Cunningham et al. |
| 6,064,984 A | | 5/2000 | Ferguson et al. |
| 6,185,550 B1 | | 2/2001 | Snow et al. |
| 6,260,024 B1 | | 7/2001 | Shkedy |
| 6,341,351 B1 | | 1/2002 | Muralidhran et al. |
| 6,366,890 B1 | | 4/2002 | Usrey |
| 6,484,149 B1 | | 11/2002 | Jammes et al. |
| 6,505,093 B1 | | 1/2003 | Thatcher et al. |
| 6,507,851 B1 | | 1/2003 | Fujiwara et al. |
| 6,614,895 B1 | * | 9/2003 | Impey et al. ............ 379/127.01 |
| 6,701,299 B2 | | 3/2004 | Kraisser et al. |
| 6,725,204 B1 | | 4/2004 | Gusley |

(Continued)

FOREIGN PATENT DOCUMENTS

JP 2004-030343 A 1/2004

(Continued)

OTHER PUBLICATIONS

U.S. Appl. No. 60/374,892, filed Apr. 22, 2002, Krajec.

(Continued)

*Primary Examiner*—Olisa Anwah
(74) *Attorney, Agent, or Firm*—Foley & Lardner LLP

(57) ABSTRACT

A method, program product and system for retrieving customer data in a call center environment, includes completing a connection between a customer and a call agent. It also includes searching a database for a customer account or a business agreement based on information provided by the customer to the call agent. It further includes searching the database optionally for a premises that is either dependent of the customer account or business agreement or that is independent of the customer account or business agreement. It still further includes determining a contract corresponding to the premises and the customer account or business agreement. It also includes a search process that is completely flexible regarding search criteria and sequence. It finally includes dealing with the customer to resolve an issue related to the contract.

24 Claims, 23 Drawing Sheets

U.S. PATENT DOCUMENTS

| | | | |
|---|---|---|---|
| 6,829,348 B1 * | 12/2004 | Schroeder et al. | 379/265.09 |
| 6,868,528 B2 | 3/2005 | Roberts | |
| 6,910,017 B1 | 6/2005 | Woo et al. | |
| 6,980,966 B1 | 12/2005 | Sobrado et al. | |
| 7,080,030 B2 | 7/2006 | Eglen et al. | |
| 7,082,408 B1 | 7/2006 | Baumann et al. | |
| 7,082,426 B2 | 7/2006 | Musgrove et al. | |
| 7,092,929 B1 | 8/2006 | Dvorak et al. | |
| 7,117,165 B1 | 10/2006 | Adams et al. | |
| 7,124,098 B2 | 10/2006 | Hopson et al. | |
| 7,124,984 B2 | 10/2006 | Yokouchi et al. | |
| 7,139,731 B1 | 11/2006 | Alvin | |
| 7,188,080 B1 | 3/2007 | Walker et al. | |
| 7,346,561 B1 | 3/2008 | Devitt et al. | |
| 2001/0019778 A1 | 9/2001 | Gardaz et al. | |
| 2001/0032130 A1 | 10/2001 | Gabos et al. | |
| 2001/0039517 A1 | 11/2001 | Kawakatsu | |
| 2001/0049634 A1 | 12/2001 | Stewart | |
| 2002/0013731 A1 | 1/2002 | Bright et al. | |
| 2002/0023500 A1 | 2/2002 | Chikuan et al. | |
| 2002/0026368 A1 | 2/2002 | Carter, III | |
| 2002/0059093 A1 | 5/2002 | Barton et al. | |
| 2002/0059108 A1 | 5/2002 | Okura et al. | |
| 2002/0072986 A1 | 6/2002 | Aram | |
| 2002/0073114 A1 | 6/2002 | Nicastro et al. | |
| 2002/0078159 A1 | 6/2002 | Petrogiannis et al. | |
| 2002/0107913 A1 | 8/2002 | Hawkins | |
| 2002/0116241 A1 | 8/2002 | Sandhu et al. | |
| 2002/0123930 A1 | 9/2002 | Boyd et al. | |
| 2002/0138290 A1 | 9/2002 | Metcalfe et al. | |
| 2002/0147668 A1 | 10/2002 | Smith et al. | |
| 2002/0152128 A1 | 10/2002 | Walch et al. | |
| 2002/0184116 A1 | 12/2002 | Tam et al. | |
| 2003/0023500 A1 | 1/2003 | Boies et al. | |
| 2003/0028393 A1 | 2/2003 | Coulston et al. | |
| 2003/0028437 A1 | 2/2003 | Grant et al. | |
| 2003/0046120 A1 | 3/2003 | Hoffman et al. | |
| 2003/0046195 A1 | 3/2003 | Mao | |
| 2003/0050852 A1 | 3/2003 | Liao et al. | |
| 2003/0074269 A1 | 4/2003 | Viswanath | |
| 2003/0083961 A1 | 5/2003 | Bezos et al. | |
| 2003/0126024 A1 | 7/2003 | Crampton et al. | |
| 2003/0144916 A1 | 7/2003 | Mumm et al. | |
| 2003/0149631 A1 | 8/2003 | Crampton et al. | |
| 2003/0149674 A1 | 8/2003 | Good et al. | |
| 2003/0158791 A1 | 8/2003 | Gilberto et al. | |
| 2003/0171998 A1 | 9/2003 | Pujar et al. | |
| 2003/0172007 A1 | 9/2003 | Helmolt et al. | |
| 2003/0200150 A1 | 10/2003 | Westcott et al. | |
| 2003/0200156 A1 | 10/2003 | Roseman et al. | |
| 2003/0208365 A1 | 11/2003 | Avery et al. | |
| 2003/0229502 A1 | 12/2003 | Woo | |
| 2004/0010463 A1 | 1/2004 | Hahn-Carlson et al. | |
| 2004/0042611 A1 * | 3/2004 | Power et al. | 379/265.02 |
| 2004/0098358 A1 | 5/2004 | Roediger | |
| 2004/0122689 A1 | 6/2004 | Dailey et al. | |
| 2004/0162763 A1 | 8/2004 | Hoskin et al. | |
| 2004/0172321 A1 | 9/2004 | Vemula et al. | |
| 2004/0186765 A1 | 9/2004 | Kataoka | |
| 2004/0186783 A1 | 9/2004 | Knight et al. | |
| 2004/0210489 A1 | 10/2004 | Jackson et al. | |
| 2004/0220861 A1 | 11/2004 | Morciniec et al. | |
| 2004/0267674 A1 | 12/2004 | Feng et al. | |
| 2005/0015303 A1 | 1/2005 | Dubin et al. | |
| 2005/0021551 A1 * | 1/2005 | Silva et al. | 707/102 |
| 2005/0055283 A1 | 3/2005 | Zarovinsky | |
| 2005/0060270 A1 | 3/2005 | Ramakrishnan | |
| 2005/0065872 A1 | 3/2005 | Moebs et al. | |
| 2005/0075915 A1 | 4/2005 | Clarkson | |
| 2005/0075941 A1 | 4/2005 | Jetter et al. | |
| 2005/0086122 A1 | 4/2005 | Cirulli et al. | |
| 2005/0096963 A1 | 5/2005 | Myr et al. | |
| 2005/0102175 A1 | 5/2005 | Dudat et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0171825 A1 | 8/2005 | Denton et al. | |
| 2005/0228685 A1 | 10/2005 | Schuster et al. | |
| 2006/0020512 A1 | 1/2006 | Lucas et al. | |
| 2006/0036507 A1 | 2/2006 | Pujar et al. | |
| 2006/0112099 A1 | 5/2006 | Musgrove et al. | |
| 2007/0050272 A1 | 3/2007 | Godlewski et al. | |
| 2008/0118051 A1 * | 5/2008 | Odinak et al. | 379/265.09 |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

Abraham et al., "An Implemented System for Improving Promotion Productivity Using Store Scanner Data", Marketing Science, Summer 1993, vol. 12, No. 3, pp. 248-269.

Anon., "(A Lot of) Life After H. Ross: Electronic Data Systems", *Financial World*, vol. 162, No. 22, Nov. 9, 1993 (p. 50(2)).

"Beyond Markdown Management", summer/autumn 03, the 4caster, Issue 4, vol. 2, 4 pages.

Brown, "The Effects of Assortment Composition Flexibility on Operating Efficiency", (Abstract Only), *Dissertation Abstracts Int'l*, vol. 55/08-A, available at least by 1994, (p. 2458).

"Retailers Manage Markdown Challenges Using i2 Solutions", Jan. 13, 2003, NRF 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Jensen et al., "Long-Term Construction Contracts: The Impact of Tamra '88 on Revenue Recognition", *Journal of Construction Education*, Spring 1997, vol. 2, No. 1, pp. 37-53.

Kelkar et al., Price Modeling in Standards for Electronic Product Catalogs Based on XML, 2002, pp. 366-375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management*, vol. 37, No. 1, Jan./Feb. 1995 (pp. 1-2).

* cited by examiner

FIGURE 1

Identify Account

Search Account or Premise

- Identify Account
- Interaction Record
- Premise Search
- Cases
- Bank Data
- Invoices
- Budget Billing Plan
- Account Balance
- Dunning Notices
- Payment Search
- Move In/Out
- Meter Readings
- Service Request
- Knowledge Search
- Call Lists
- Campaigns
- E-Mail
- Chat
- Scripts
- Index

- Inbox
- Interaction History

Last Name/First Name
Addresstype ● Account ○ Premise
Street / House No.
Zip/City
Country/Region [DE] [Germany]
Telephone/E-mail
Date/City of Birth
Account/Bus. Agreement

[Search Account] [Search Premise] [Create Account] [Clear]

Driver License
Soc. Sec. Number
Invoice
Contract
Serial Number
Point Of Delivery
Premise More Fields ▼

Result List

0/0

[Hold] [Unhold] [Hang Up] [Dial] [Transfer] [End] [Dial Pad]

[Accept] [Reject] ◄ ►

● Ready ○ Wrap Up ○ Not Ready ▼

+49/6227/747474 — 210
[Accept] [Reject] — 220

+49/800/55055050
Phone Inbound    ready
Alerting    0:10 / 0:10
● Ready  ○ Wrap Up  ○ Not Ready  — 230

[Hold] [Unhold] [Dial] [Hang Up] [Transfer] [End] [Dial Pad] — 240

Identify Account
Interaction Record
Premise Search
Cases
Bank Data
Invoices
Budget Billing Plan
Account Balance
Dunning Notices
Payment Search
Move In/Out
Meter Readings
Service Request
Knowledge Search
Call Lists
Campaigns
E-Mail
Chat
Scripts
Index Inbox
Interaction History

Identify Account

Search Account or Premise

Last Name/ First Name
Addresstype                    ● Account         ○ Premise
Street / House No.
Zip/ City                      DE  Germany
Country/ Region
Telephone/ E-mail
Date/ City of Birth
Account/ Bus Agreement

[Search Account] [Search Premise] [Create Account] [Clear]

Driver License
Soc. Sec. Number
Invoice
Contract
Serial Number
Point Of Delivery
Premise More Fields

Result List

+49/6227/747474 | | Hold | Unhold | Hang Up | Dial | Transfer | End | Dial Pad |

Accept | Reject

Phone Inbound    +49/800/550550550
Connected    0:20 / 0:20    ready

⦿ Ready   ◯ Wrap Up   ◯ Not Ready

- Identify Account
- Interaction Record
- Premise Search
- Cases
- Bank Data
- Invoices
- Budget Billing Plan
- Account Balance
- Dunning Notices
- Payment Search
- Move In/Out
- Meter Readings
- Service Request
- Knowledge Search
- Call Lists
- Campaigns
- E-Mail
- Chat
- Scripts
- Index
- Inbox
- Interaction History

Identify Account

Search Account or Premise

| Last Name/ First Name | Müller | | Driver License | |
| Addresstype | ◯ Account  ⦿ Premise | — 520 | Soc. Sec. Number | |
| Street / House No. | Waldgasse | | Invoice | |
| Zip/ City | | | Contract | |
| Country/ Region | DE  Germany | | Serial Number | |
| Telephone/ E-mail | | | Point Of Delivery | |
| Date/ City of Birth | | | Premise | |
| Account/ Bus.Agreement | | | | |

— 510

— 530

More Fields

[ Search Account ] [ Search Premise ] [ Create Account ] [ Clear ]  — 540

Result List

4 Accounts Found — 550

| Account | Account ID | Street | City | Postal Code | Telephone |
|---|---|---|---|---|---|
| ■ Müller KG | 1549965 | Waldgasse 7 | Musterstadt | 50555 | +49/6123/412-7743 |
| ■ Müller, Eva | 5841236 | Waldgasse 3-11 | Grünstadt | 50235 | +49/6231/1663554 |
| ■ Müller, Jens | 1043995 | Waldgasse 3 | Blaudorf | 50201 | +49/6227/762730 |
| ■ Müller, Werner | 5129845 | Hauptstraße 29 | Metropolis | 54748 | +49/2335/747474 |

| Accept | Reject | | Hold | Unhold | Hang Up | Dial | Transfer | End | Dial Pad |

Phone Inbound +49/800/550550550
Connected 0:25 / 0:25 ready

● Ready ○ Wrap Up ○ Not Ready

Identify Account
Interaction Record
Premise Search
Cases
Bank Data
Invoices
Budget Billing Plan
Account Balance
Dunning Notices
Payment Search
Move In/Out
Meter Readings
Service Request
Knowledge Search
Call Lists
Campaigns
E-Mail
Chat
Scripts
Index
Inbox
Interaction History

Identify Account

Account 1043995

| Field | Value | | More Fields |
|---|---|---|---|
| Last Name/ First Name | Müller | Jens | |
| Title/ Acad. Titles | Mr. | | 3 |
| Street/ House No. | Waldgasse | | |
| Zip/ City | 50201 | Blaudorf | |
| Country/ Region | DE | Germany | |
| Telephone /e-mail | 5301798 | | |
| Date /City of Birth | | | |
| Business Agreement | | Waldgasse 3, Blaud | |

[ Confirm ] [ Clear ] [ Save ]

— 620
— 610

Search Premise

| Field | Value | | More Fields |
|---|---|---|---|
| Premise Street/ No. | Waldgasse | | |
| Premise Zip/ City | | | |
| Premise Country/ Region | DE | Germany | |
| Invoice/ Contract | | | |
| Serial Number/ POD | | | |
| Premise | | | |

[ Search Premise ] [ Clear ]

☒ Search related to Account
☒ Search related to Business Agreement

— 630

Result List

4 Accounts Found

| Account | Account ID | Street | City | Postal Code | Telephone |
|---|---|---|---|---|---|
| Müller KG | 1549965 | Waldgasse 7 | Musterstadt | 50555 | +49/6123/412-7743 |
| Müller, Eva | 5841236 | Waldgasse 3-11 | Grünstadt | 50235 | +49/6231/1663554 |
| Müller, Jens | 1043995 | Waldgasse 3 | Blaudorf | 50201 | +49/6227/762730 |
| Müller, Werner | 5129845 | Hauptstraße 29 | Metropolis | 54748 | +49/2335/747474 |

| Accept | Reject | Hold | Unhold | Hang Up | Dial | Transfer | End | Dial Pad |

Phone Inbound    +49/800/550550550
Connected   0:30 / 0:30   ready

● Ready   ○ Wrap Up   ○ Not Ready

- Identify Account
- Interaction Record
- Premise Search
- Cases
- Bank Data
- Invoices
- Budget Billing Plan
- Account Balance
- Dunning Notices
- Payment Search
- Move In/Out
- Meter Readings
- Service Request
- Knowledge Search
- Call Lists
- Campaigns
- E-Mail
- Chat
- Scripts
- Index
- Inbox
- Interaction History

Identify Account

Account 1043995

| Field | Value | | More Fields |
|---|---|---|---|
| Last Name/ First Name | Müller | Jens | |
| Title/ Acad. Titles | Mr. | | |
| Street/ House No. | Waldgasse | | 3 |
| Zip/ City | 50201 | Blaudorf | |
| Country/ Region | DE | Germany | |
| Telephone /e-mail | | | |
| Date /City of Birth | 5301798 | | |
| Business Agreement | | Waldgasse 3, Blaud | |

[ Confirm ] [ Clear ] [ Save ]   — 720

Search Premise

| Field | Value | | More Fields |
|---|---|---|---|
| Premise Street/ No. | | | |
| Premise Zip/ City | | | |
| Premise Country/ Region | DE | Germany | |
| Invoice/ Contract | | | |
| Serial Number/ POD | | | |
| Premise | | | |

[ Search Premise ] [ Clear ]   — 710

☒ Search related to Account
☒ Search related to Business Agreement

Result List

4 Accounts Found

| Account | Account ID | Street | City | Postal Code | Telephone |
|---|---|---|---|---|---|
| ■ Müller KG | 1549965 | Waldgasse 7 | Musterstadt | 50555 | +49/6123/412-7743 |
| ■ Müller, Eva | 5841236 | Waldgasse 3-11 | Grünstadt | 50235 | +49/6231/1663554 |
| ■ Müller, Jens | 1043995 | Waldgasse 3 | Blaudorf | 50201 | +49/6227/762730 |
| ■ Müller, Werner | 5129845 | Hauptstraße 29 | Metropolis | 54748 | +49/2335/747474 |

Jens Müller

Accept | Reject | Hold | Unhold | Hang Up | Dial | Transfer | End | Dial Pad

Phone Inbound Connected +49/800/550550550
0:35 / 0:35 ready
● Ready ○ Wrap Up ○ Not Ready

Identify Account
- Interaction Record
- Premise Search
- Cases
- Bank Data
- Invoices
- Budget Billing Plan
- Account Balance
- Dunning Notices
- Payment Search
- Move In/Out
- Meter Readings
- Service Request
- Knowledge Search
- Call Lists
- Campaigns
- E-Mail
- Chat
- Scripts
- Index Inbox
Interaction History

Account 1043995

| Field | Value | | More Fields |
|---|---|---|---|
| Last Name/ First Name | Müller | Jens | |
| Title/ Acad. Titles | Mr. | | 3 |
| Street/ House No. | Waldgasse | | |
| Zip/ City | 50201 | Blaudorf | |
| Country/ Region | DE Germany | | |
| Telephone /e-mail | | | |
| Date /City of Birth | | Waldgasse 3, Blaud | |
| Business Agreement | | | |

Confirm | Clear | Save

Premise 10436525

| Field | Value | | More Fields |
|---|---|---|---|
| Street/ No./ Suppl | Hauptstraße | Rot | 15 |
| Zip/ City | 55554 | | |
| Country/ Region | DE Germany | | |
| Street Suppl. 1/2 | | | |
| Floor/ Room No. | 1. OG | | |
| Location Suppl. | | | |
| Current Account | (empty) | | |

Confirm | Clear | Save ← 1010

1050

Result List

3 Premises Found

| Street | House No. | Zip | City | Floor | Room No. | Current Account |
|---|---|---|---|---|---|---|
| Hauptstraße | 15 | 55554 | Rot | EG | | Jens Müller |
| Hauptstraße | 15 | 55554 | Rot | 1. OG | | (Leerstand) |
| Hauptstraße | 15 | 55554 | Rot | 2. OG | | Harald Schmidt |

FOCUSED RETRIEVAL OF SELECTED DATA IN A CALL CENTER ENVIRONMENT

BACKGROUND OF THE INVENTION

A. Field of the Invention

The present invention is directed to the field of data retrieval and specifically to assisting call center personnel in accessing data quickly and efficiently.

B. Background

Customer service representatives must be able to handle customer inquiries and issues quickly and effectively. This is especially true for call center agents where numerous customer calls are received in short periods of time. The more quickly the agent can handle a particular customer's issue, the more quickly the agent can move on to the next call.

For conventional search products used by call center agents, the call center agent always has to first identify the account of the caller, and then the agent is provided with information related to the account. The agent must then select an object on a business information side, in order to obtain information on a technical information side. This selection can be a very difficult process, given the differences in between business-type data and technical-type data. Other conventional search products used by call center agents require the agent always to first identify a premises of the caller, and then the agent is provided with information related to the premises. The agent must then select an object on a technical information side, in order to obtain pertinent information on a business information side. This selection can be a very difficult process as well, given the differences between business-type data and technical-type data.

Existing call center technology is lacking in certain areas, including being able to quickly retrieve selected data about a customer or customer account, irrespective as to the type of data that is to be searched is database of technical and business information.

SUMMARY OF THE INVENTION

An exemplary object of the invention is to provide a tool that helps a call agent to identify a customer and retrieve customer account information quickly and efficiently. A further exemplary object of the invention is to provide a tool that helps a call agent to make changes to a customer quickly and efficiently. Another exemplary object of the invention is to provide a tool that helps a call agent to identify a customer account or business agreement and then identify a dependent or independent premises, and that retrieves customer account information quickly and efficiently.

An embodiment of the present invention discloses a method, program product and system for modifying customer data in a call center environment. The method includes completing a connection between a customer and a call agent. It also includes searching a database for a customer account or a business agreement based on information provided by the customer to the call agent. It further includes searching the database optionally for a premises that is either dependent of the customer account or business agreement or that is independent of the customer account or business agreement. It still further includes determining a contract corresponding to the premises and the customer account or business agreement. It also includes dealing with the customer to resolve an issue related to the contract Another embodiment of the present invention discloses a method, program product and system for retrieving and updating customer data in a call center environment. This includes: completing a connection between a customer and a call agent; searching a database for a customer account or business agreement based on information provided by the customer to the call agent; searching the database for a premises related to the customer account or business agreement or that is related to the customer and is independent of the customer account of business agreement; updating the premises and/or creating a new premises for the customer account or business agreement based on information provided by the customer to the call agent; and storing the updated premises in the database.

Yet another embodiment of the invention relates to a method of retrieving customer data in a call center environment, including completing a connection between a customer and a call agent. The method also includes obtaining first information from the customer related to a problem to be corrected. The method further includes entering, by the call agent, the first information onto a display. The method still further includes obtaining second information from the customer related to either technical matters or business matters of the problem to be corrected. The method further includes searching a database for a customer account or a business agreement based on either a first search criteria or a second search criteria, the first search criteria being used when the second information is related to technical matters and the second search criteria being used when the second information is related to business matters.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which:

FIGS. 1-19 illustrate screens of a user interface under an exemplary embodiment of the invention;

DETAILED DESCRIPTION OF EXEMPLARY EMBODIMENTS

Figure 3:
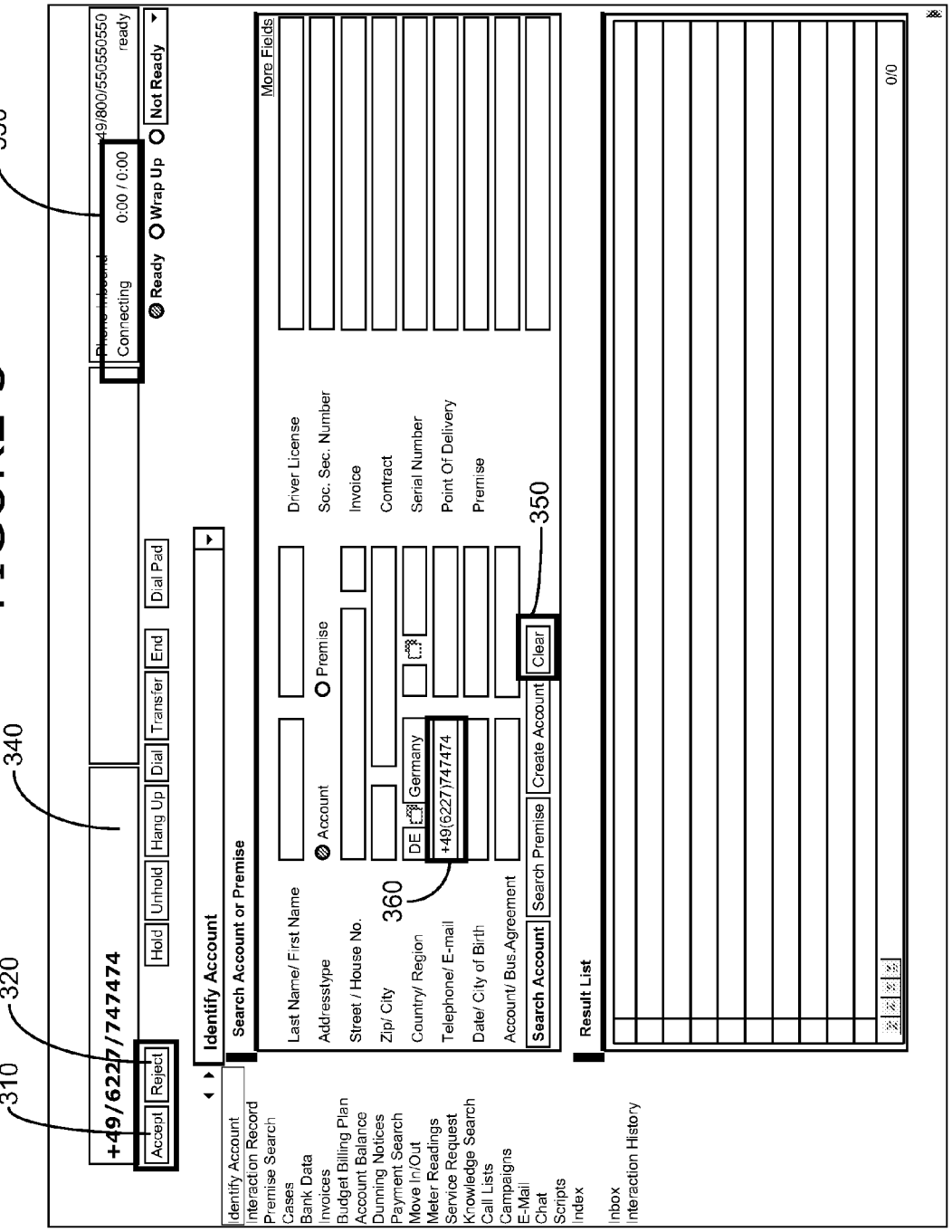

The invention described herein is, in a preferred embodiment, implemented on a computer system used by a call center. The system will include call agent terminals, servers, and at least one database containing customer information. Any customer interaction in the call center begins with the identification of the relevant business objects. For example, the caller is usually identified first. Dependent on the issue presented by the customer, additional identified objects can be required for accessing data or needed to restrict or focus the processing context to make it more meaningful and efficient.

Call center agents frequently need to update customer information. They also, depending upon the focus of the company, may need to transfer existing accounts to new addresses or create new accounts. This happens, for example, in utility companies when a customer needs to initiate service or transfer existing service to a new location. This can also happen when a customer needs to add a new phone number to his/her account, to change an existing phone number on his/her account to a different phone number, to change an e-mail address for an account of the customer that is currently stored in a database, or to change actual address information (premises information) for that customer for a particular account or business agreement.

Placing restrictions for search criteria is often useful at the level of contract accounts or premises, in order to obtain not too many search hits that would otherwise cause the agent to spend too much time searching each of the hits in turn. A contract is used for processing business processes, whereby an account typically has one or more contracts associated with it. A business agreement is an agreement between a business of a customer and a business managed by a call center. A premises corresponds to a particular address of a business or individual. The premises (address of location) is also the key object in many customer issues, such as move-in/out processing. The premises that is to be identified can originate from the customer context or can be completely independent of the customer context.

Since the objects that are to be identified are not all available to a call center agent (such as premises that are independent of a business agreement or account), nor are all the possible search characteristics (such as invoice numbers, premises addresses), the identification process should be designed so that the search is carried out remotely via accesses to a backend database which stores the pertinent customer information and account and business agreement information.

Often, the sequence in which objects are identified cannot be predefined; it results from the conversation with the customer, the required process(es), and the identification characteristics known. The identification process must, therefore, be flexible regarding search criteria and sequence. It must also be possible to introduce a caller as a new business partner in the system, change a caller's data, and change contract account data.

At least three features of the invention are highlighted by way of the examples shown in FIGS. 1-19. These features have been termed: Identifying an Account and Business Agreement Followed by an Independent Premises, Identifying an Account and Business Agreement Followed by a Dependent Premises and Identifying an Account and Changing Account Master Data. The invention also includes other features, such as: Identifying a Premises and then a Dependent Business Partner/Contract Account, Identifying a Business Partner with Explicit Identification of a Contract Account, Creating a Business Partner Record, Maintaining a Business Partner Record, Maintaining a Contract Account and Maintaining Premises Information.

Figure 20:
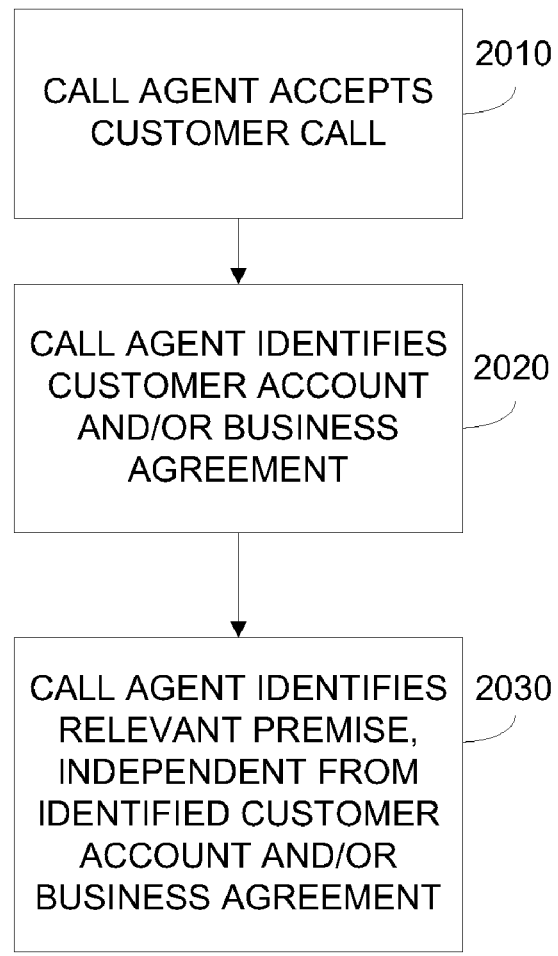
FIG. 20 is a flowchart illustrating the method under a first exemplary embodiment of the present invention.

Identifying an Account and Business Agreement Followed by an Independent Premise This feature and method of an exemplary embodiment of the present invention is illustrated using the example described herein of a call agent's interaction with a customer in processing a move in/move out request for a utility. FIG. 20 illustrates a flowchart illustrating the method under this embodiment of the present invention, the details of which are described herein. Step 2010 shows a call agent accepting a customer call. Step 2020 shows a call agent identifying a customer account and/or business agreement. Step 2030 shows a call agent identifying a relevant premises that is independent from the identified customer account and/or business agreement.

The present invention according to the exemplary embodiment provides a mechanism for relating business master data with technical master data, in order to allow a call center agent to quickly an efficiently handle a call from a customer. Business master data includes account data, business agreement data, and contract data, e.g., information related to the business side of a transaction. Technical master data includes connection objects (e.g., an apartment building having many separate premises and many separate meters, or a single family dwelling having a gas meter, an electric meter, and a heating oil meter), point of deliveries (PODs), and contracts, e.g., information related to a particular technical device, such as an electrical meter located at a particular location. A POD may correspond to a particular meter having a particular identification number assigned to it, for providing a particular service (e.g., electric meter, gas meter). By allowing an agent to search by using technical master data or business master data, and by mapping together those separate types of data, a call center agent is provided with all pertinent information in order to assist a caller, no matter what the caller is calling about.

The exemplary embodiment allows a call center agent to identify a premises first, and then from that derive an account related to the premises automatically, or to identify an account first and then automatically derive a premises related to the account. The call center agent chooses with path to take, based on the way a call is progressing with a caller.

Business master data is stored in a database of customer data as separate accounts, whereby each separate account has 1 to N business agreements (e.g., terms of payment, etc.), and whereby each business agreement has 1 to N contracts (whereby a contract is for a particular service for a particular time period). Technical master data is stored in the database as a plurality of connection objects, whereby each connection object may correspond to a particular building or structure. Each connection object has 1 to N premises (e.g., individual dwellings in the building or structure), and each of the premises has 1 to N contracts (representing different services for different periods of time to be provided at the premises).

The common element for the business data and the technical data is the 'contract', which is used to link information from these two sides, and to provide the call center agent the relevant data during a call from a caller. A contract is a legal agreement between a customer and a supplier, for a particular service to be performed over a particular period of time (e.g., to delivery electrical service to the customer's home address for the entire year 2007).

FIG. 1 illustrates a start page under an exemplary embodiment of the present invention. When an agent logs on, the identification screen shown in FIG. 1 is displayed as the start page. In this screen, the Accept button 110 and the Reject button 120 are displayed without any additional indicators since, in this scenario, no call has been received. The status of the agent is indicated as Ready in element 130. This shows that the interaction center agent is ready to accept a call.

FIG. 2 illustrates the agent's screen from FIG. 1, but now with an incoming call. Upon receiving a call, the system changes the color of the Accept and Reject buttons 210 and 220 (e.g., from a neutral color, such a white, to a more distinctive color such as blue or green or orange). In a preferred embodiment, these buttons are flashing orange. The incoming call information is displayed in a multi channel status area 230. The telephone number that the caller dialed is displayed therein. This area 230 also shows time data for how long the customer has been on hold; in this figure, the time period is 10 seconds. The caller's telephone number is displayed in the context area 240. Also, if it can be uniquely determined on the basis of the telephone number, the caller's name is also displayed in this area 240. The interaction center agent can now decide whether or not to accept the call. The agent can accept the call by depressing the Accept button 210 with the computer pointing device.

In FIG. 3, the agent has accepted the call. The Accept and Reject buttons 310 and 320 are no longer highlighted. The caller's telephone number still appears in the context area 340. The multi channel status area 330 indicates that the call has been accepted as shown by the "connected" indicator. Also, the time data is reset and subsequently indicates the duration of the connected call. If the caller can be uniquely identified by the telephone number, detailed data about the caller is displayed directly on this screen and subsequent search steps are skipped. If the caller could not be uniquely identified by the telephone number, this number is transferred to the relevant field 360 in this search criteria. If the agent does not want to search by telephone number or if searching by telephone number does not produce any results the agent can simply delete the telephone number by pressing the clear button 350. Furthermore, the agent does not receive any other inbound calls while talking to this caller.

In FIG. 3, the call center agent has chosen 'Account' for the Address type, whereby the call center agent could have alternatively have chosen 'Premises' for the Address type. This selection is made based on information provided by the caller to the call center agent. In this instance, the call center agent has decided that searching for addresses related to a particular account is better than searching for addresses related to a particular premises. This may be the case whereby the caller is calling to correct a problem with a particular meter located a particular location, irrespective as to an account associated with that meter. In a different scenario, if the caller is calling to correct a problem with his or her account, then the call center agent will likely choose "Account" address type for performing a search to obtain the account of the caller.

Figure 4B:
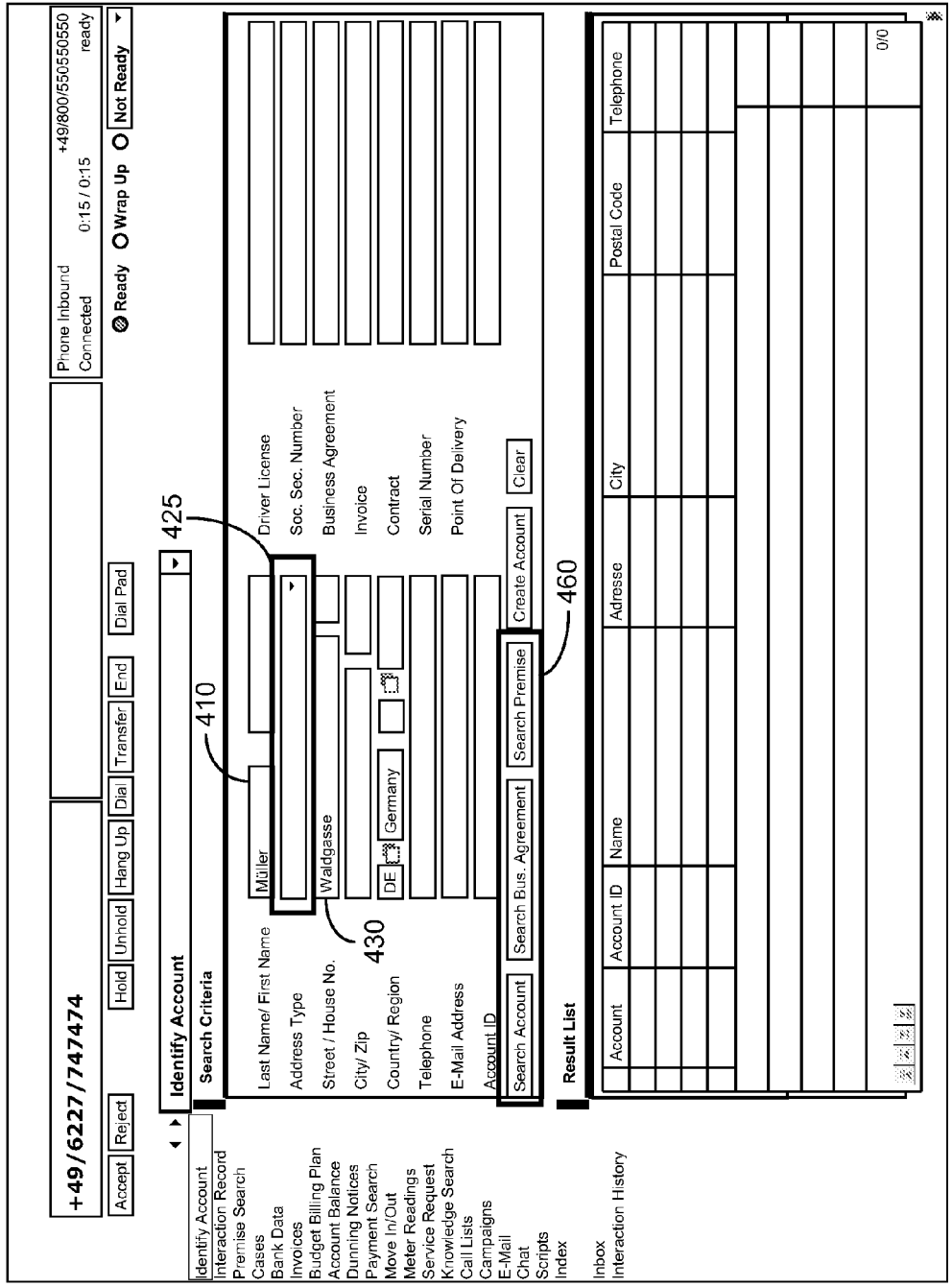

FIGS. 4A and 4B illustrate identifying an account by entering search criteria. In FIG. 4A, the screen from the user interface indicates that a customer has now been identified in the system. This search criteria include account attributes and attributes of other objects connected to the account (e.g., business agreements of the account, and contracts assigned to each business agreement), in particular those objects that are stored only in a back end database (which stores account information, premises information, and other information of customers, and which is accessible by a call agent by way of a graphical user interface such as the one shown in FIGS. 1-19). In this screen, the last name of the customer is indicated in field 410, whereby that information is provided to the call agent by the caller, and is typed into field 410 by the call agent. The street name is indicated in field 430, and is also provided to the call agent by the caller during the telephone call. In an effort to search for the appropriate account, the agent can select the address type in field 420. In FIG. 4A, this is shown as a selection from a plurality of radio buttons. In FIG. 4B, this selection is among a drop down list in field 425. In both of these figures, if the address type is set to "account", the entered address is interpreted as the business partner address. If the address type is set to "premises", the address is interpreted as the customers premises address (often known as "home address"), and is not necessarily related to any particular account. The agent enters the search criteria ascertained from the conversation with the customer. The agent then chooses one of the search options provided, depending on how the conversation is expected to proceed. That is the agent can choose, in this example, between searching by account or by the premises. This selection is made in field 440 as shown in FIG. 4A. As shown in FIG. 4B, the selection is made in field 460, which further includes a search by business agreement. Irrespective of whether the agent searches for the account immediately or first searches for a premises, an account number is identified in order to facilitate the documentation of the interaction with the customer. Note that the call center agent has entered in the caller's last name (Muller) in field 410 and the caller's partial address in field 430, whereby that information is utilized for the upcoming search to be performed on the database.

FIG. 5 illustrates the agent screen when searching for an account of the caller. In this example, field 510 contains the caller's last name. Field 520 indicates the address type as "premises." Field 530 contains the name of the street of the caller. While the last name and street are shown in this example, the invention includes the use of any piece or pieces of information collected from the caller in order to search for an account. Field 540 contains push buttons the agent may depress to perform certain functions, including searching for an account or premise.

In this example, the agent clicks the search account button. The system then conducts a search based on the information entered and searches for the accounts meeting the search criteria. If no single unique match is found, the search results of multiple matches are displayed in the lower half of the screen, as shown in box 550. In this example, four accounts were found, each having the same last name as the caller. Accounts with different addresses are also found if the address type premises is chosen for the search criteria and the account has a contract for another address in addition to the same premises address of the caller. Also, accounts with different addresses are found if the address that was searched is an additional address for the account and not necessarily the main address.

As shown in box 550, the search results under this example include one account containing an address not specifically searched for. A plurality of selection boxes 560 are displayed next to the search results in 550. One box is provided for each search result. FIG. 6 illustrates a screen display used by call agent to select an account from a plurality of accounts found in the search. The search results are also referred to herein as a 'hit list'.

As seen in FIG. 6, once the account has been identified, the top portion the display is separated into a left region containing information on the identified account, and a right region corresponding to a "search premises" area for the agent to enter in data to search for premises either related to the identified account or to a business agreement, or to search for premises not related to the identified account.

FIG. 6 illustrates the selection of an account from the hit list. To display additional details for one of the accounts found, the agent selects the relevant row in the results list 650. For example, from the plurality of buttons 660, the agent selects and clicks button 640, in order to obtain more information on the account of "Jens Muller". Then, in box 610, the relevant details for the selected account are displayed. The agent can select several hits, one after the other, in order to identify the correct account on the basis of the detailed data. If the search criteria identify a unique business agreement, or if only one business agreement belongs to the account, the business agreement is also displayed. The business agreement number for this example is shown in box 620. Box 630 shows the search criteria area where the agent can search for a premises related to an account or business agreement.

FIG. 7 illustrates the confirmation of an account by a call agent. With the detailed account information shown in box 710, the agent can confirm with the customer that the correct account has been identified. The agent then sends confirmation to the system that indeed is the account the agent wishes to select. This is done by pressing the Confirm button 720. The account number (1043995) is then provided displayed prominently in a context area on the top left side of the display, as the account of interest.

Once the account has been identified, the system automatically starts to search for premises related to the identified account. That way, the call center agent will be provided with a list of possible customer premises, so that the call center agent can then determine which one is pertinent to the reason why the caller is calling in reference to his or her account.

Figure 8:
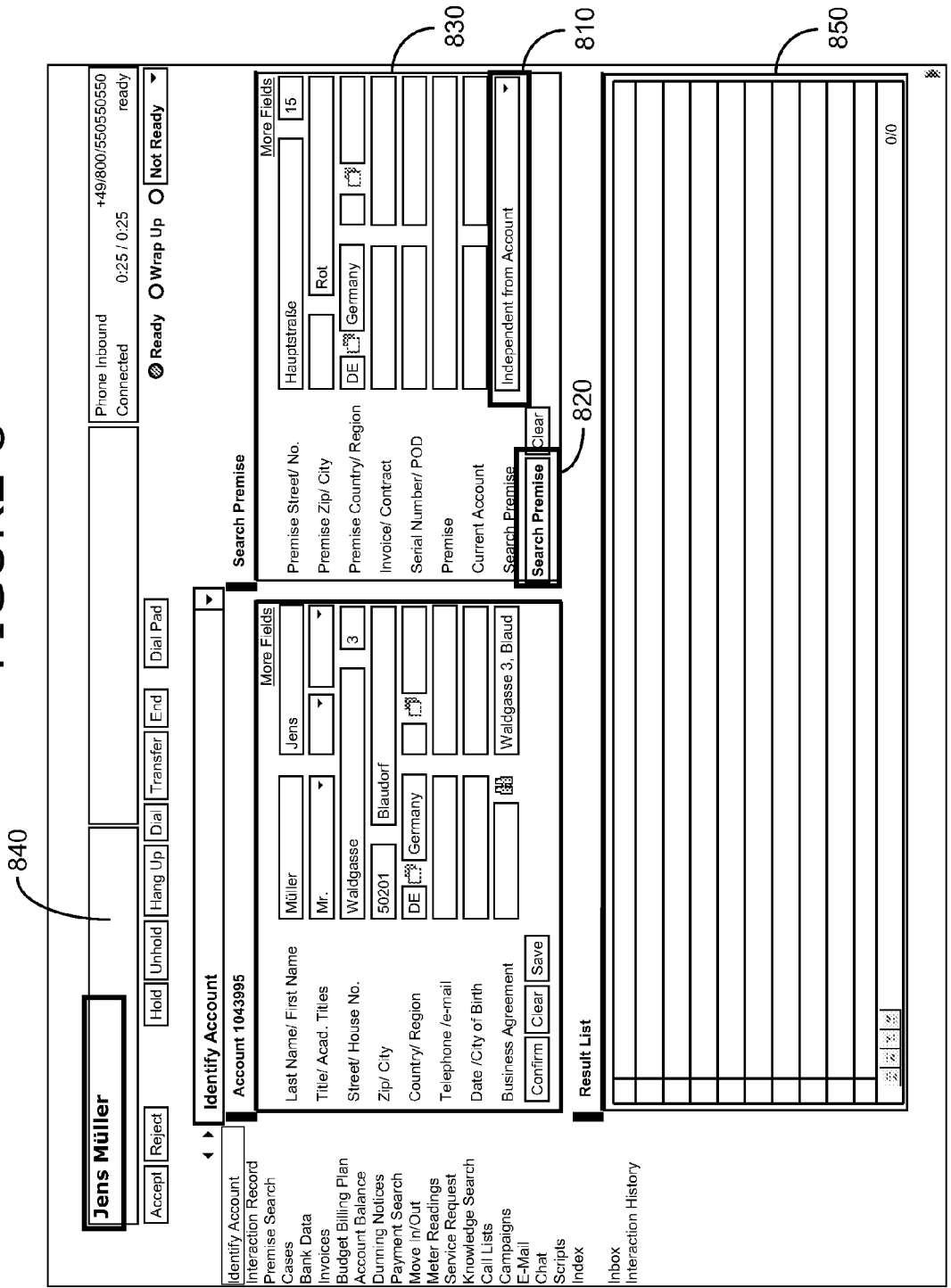

FIG. 8 illustrates a call agent searching for a premises independent from the account selected. This may be utilized for a case whereby an identified account has many premises associated with it, and whereby a premises search will narrow down the number of possible premises that are the basis of the call, so as to assist the call center agent to determine the correct premises in a quick and easy manner. Once the account has been confirmed, as shown in FIG. 7, an indicator of the account is transferred to the context area 840. In this example, the name on the account is shown in context area 840. At the same time, an interaction record is created in the background. The account is also written to an activity clip board, which makes it automatically available for further processing steps. That is, the information stored in the activity clip board can be used for additional searches by the call agent, since that information is available to the call agent from the clip board (until that information is overwritten by other information written into the clip board). In the example shown in FIG. 8, no premises currently exists for the identified account. For this reason, the hit list 850 is empty and the premises remains in search mode. Independent from the account identified, the agent can search for a premises in box 830. As shown in this example, the street name and the premises city are different than that of the identified account. In box 810 the agent has selected to search a premises independent from the account. By pressing the search premises button 820, the agent can search for the desired premises based on the portion of the address entered in box 830.

Figure 9:
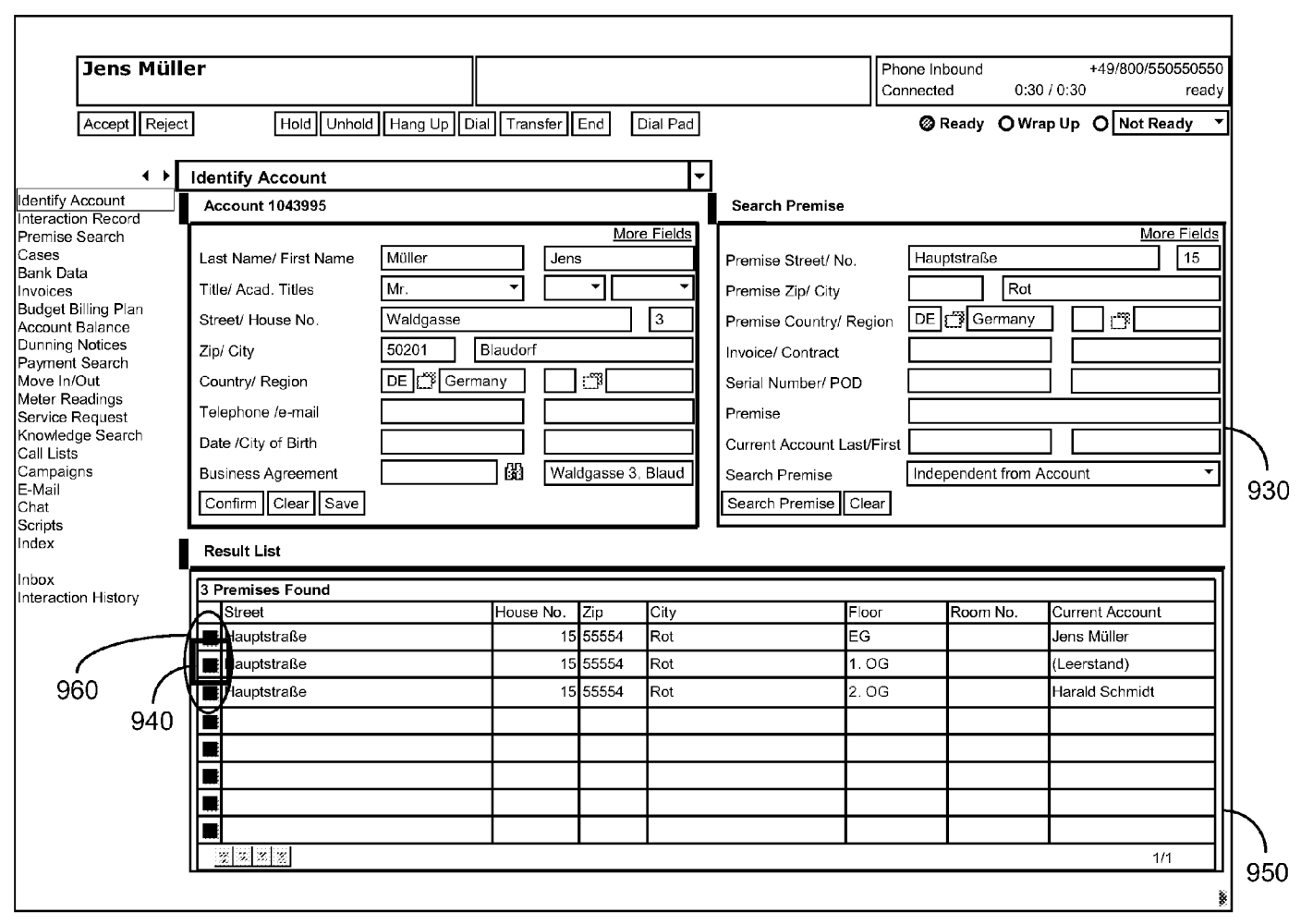

The search finds, in this example, three premises which are displayed in the hit list 950 as shown in FIG. 9. Here, the agent has the ability to select the vacant premises ("Leerstand") that is to be tied to the selected account. A plurality of selection boxes 960 are arranged next to the entries in the hit list. In this example, the agent would click on box 940 to select the vacant premises. In this instance, the caller may be calling to set up a contract for a new location that the caller is moving to. In this case, that new location is not associated with the caller's account, and so by providing the new location as a search term in the 'search premises' field of the display, the call center agent can quickly find the premises of interest, and then assign that premises (and contract, if needed) to the account of the caller.

Once the vacant premises is selected, as shown in FIG. 10, the corresponding premises information is displayed in the premises area 1050. The agent can review this information and confirm it by pressing button 1010.

Figure 11:
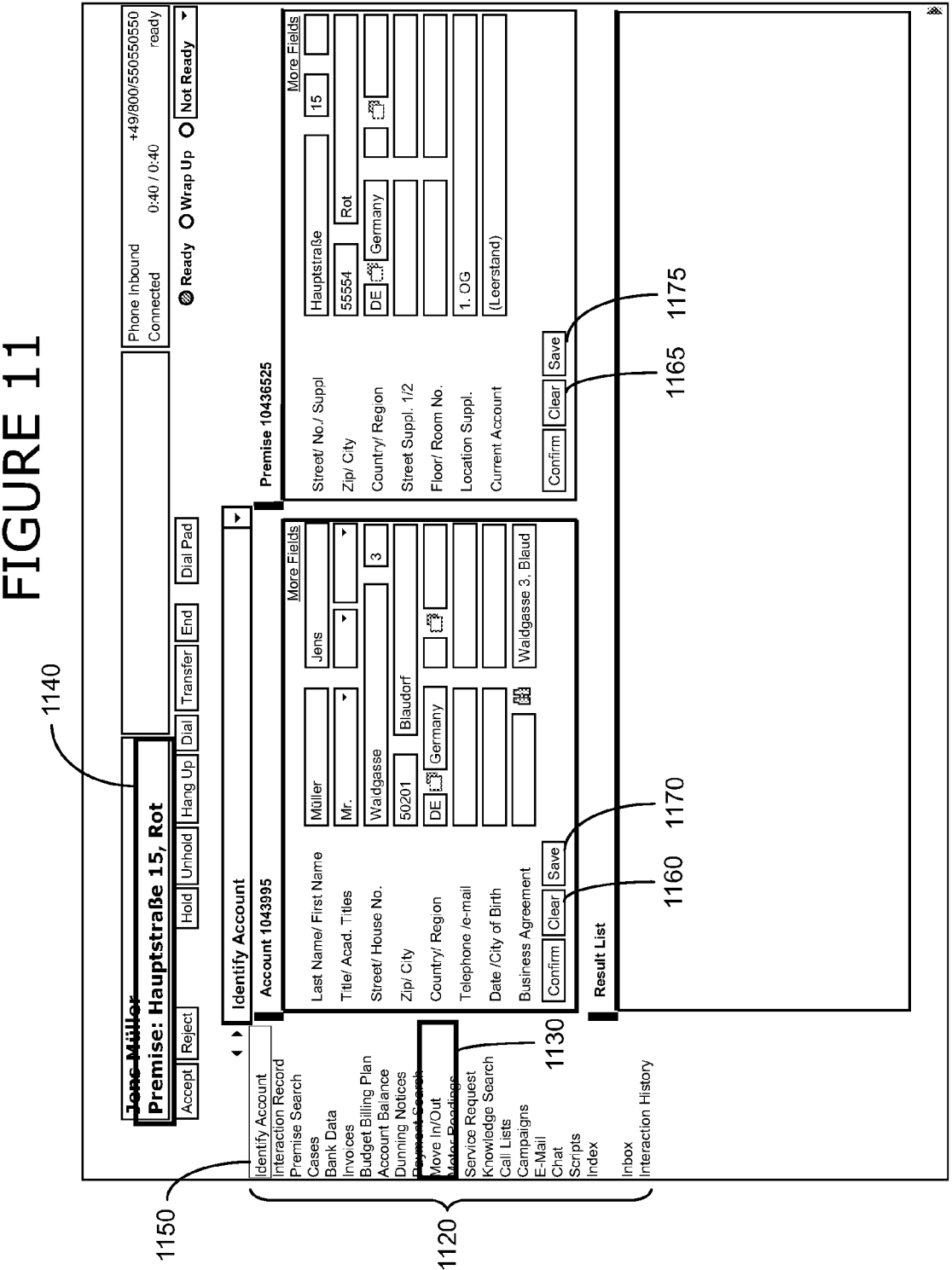

FIG. 11 illustrates ending the identification process. When the agent has confirmed the premises as described with respect to FIG. 10, the system displays the premises address in the context area 1140. The premises is also copied to an activity clip board which makes it available for subsequent processes. In this example, steps taken to perform a move in or move out function have been illustrated. Thus, the agent would select the move in/out command 1130 from the list of available options 1120. Further, the system can be set to open an interaction record automatically once both the account and the premises have been confirmed. The agent can click the Identify Account button 1150 at any time to go back to the current status of the identification process. The agent can make subsequent corrections or changes to the identified objects by clicking the clear buttons 1160 and 1165. The agent can change the fields displayed directly and save the changes by clicking the save buttons 1170 and 1175. The agent can create a new account by clicking the create account button 450 as shown in FIG. 4A.

As an example, if a caller has called an agent and has said that there is a problem associated with his or her invoice, the agent will enter in the invoice number on the display initially. Now, if the caller states that the problem is that the invoice has incorrectly listed the metered amount for a particular meter at a particular location, the agent can then decide to do a 'search premises' process in order to pull up the relevant data, in order to correct this 'technical' problem. On the other hand, if the caller stated that there is misspelling of his/her name on the invoice or to correct a phone number assigned to the caller's account, then the agent can instead decide to do a 'search account' process in order to correct this 'business' problem of the caller's account.

Thus, the system efficiently performs searching based on the information provided by the caller to the call center agent, to allow the agent to determine whether the searching is to be based on technical information (premises search) or on business information (account search). For an account search, all premises associated with the account are provided on the display, and with a premises search, all premises that hit the premises search terms are provided on the display (to then allow the user to determine the correct one of the caller, and to then determine the account of the caller). For cases in which an account has only one premises associated with it, either search type will come up with the 'other' data (e.g., either the account associated with the premises, or the premises associated with the account).

In this embodiment, the searching of premises that are independent of an account breaks the link between business and technical data, to thereby provide the agent will all premises that have data identical to the data entered in the search premises field of the display. That way, all pertinent premises, whether or not they are linked to the account already determined by the agent, are provided on the hit list. Thus, a premises that is assigned to a contract that is not a part of the already-determined account, but that matches the premises search terms, is displayed on the hit list.

Identifying an Account and Business Agreement Followed by a Dependent Premise

Figure 21:
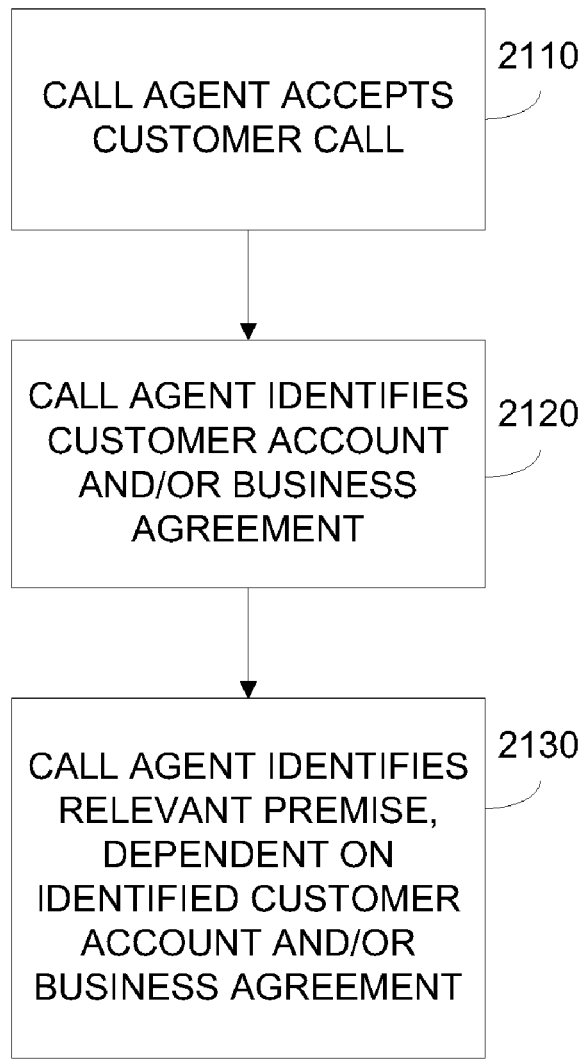
FIG. 21 is a flowchart illustrating the method under a second exemplary embodiment of the present invention.

This feature and method of an exemplary embodiment of the present invention is illustrated using the example described herein of a call agent's interaction with a customer in processing a move in/move out request for a utility, where the premises address is not independent from the customer's existing account or business agreement. FIG. 21 illustrates a flowchart illustrating the method under this embodiment of the present invention, the details of which are described herein. Step 2110 shows a call agent accepting a customer call. Step 2120 shows a call agent identifying a customer account and/or business agreement. Step 2130 shows a call agent identifying a relevant premises that is dependent on the identified customer account and/or business agreement.

This embodiment uses the same method and screen displays as illustrated and described above with respect to FIGS. 1-4A and 5-7. Then, it proceeds to FIG. 12.

Figure 12:
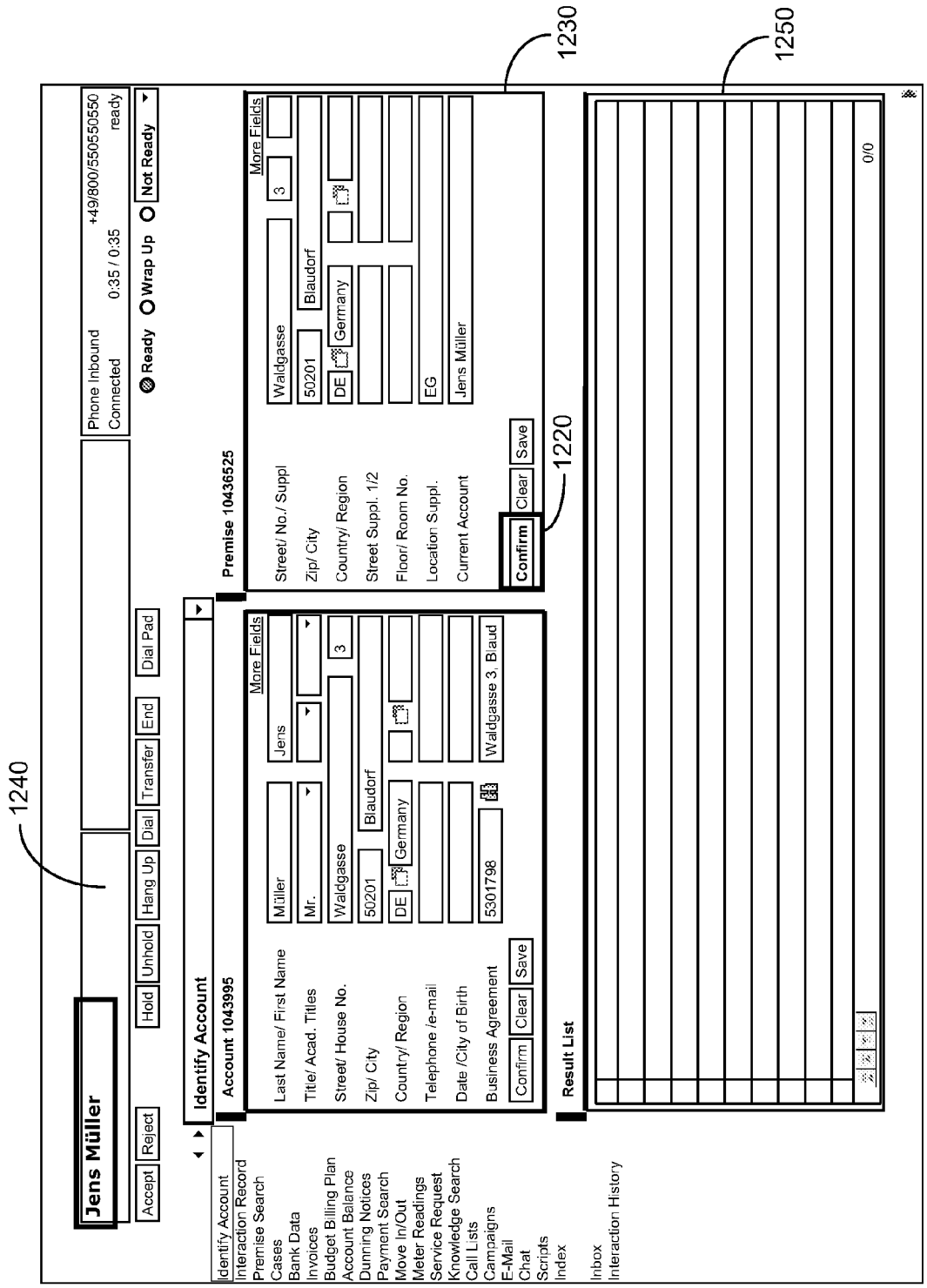

FIG. 12 illustrates searching for and confirming a premises of the customer that is dependent on the selected account. After the account is confirmed, as shown in FIG. 7, one or more pieces of information identifying the account are transferred to the context area 1240. In this example, the name associated with the account has been transferred and is now displayed in context area 1240. At the same time, an interaction record is created in the background. The account is also written to an activity clip board which makes it automatically available for further processing steps. If a premises is uniquely identified by the account, business agreement, and original search criteria, that premises is automatically display in the premises area 1230. Otherwise, a hit list providing a plurality of premises for the account or business agreement is displayed in area 1250.

In the example shown, there is one premises corresponding to the selected account. This premises and related information is shown in premises area 1230. If multiple premises are associated with the confirmed account, these premises would be shown in the hit list area 1250 and would have, associated with them, boxes corresponding to each premise. Using such selection boxes, not shown in FIG. 12, the agent could select from among the plurality of premises. The selected premises and corresponding information would then be displayed in premises area 1230. Once the correct premises is shown in this premises area 1230, the agent can chose to confirm that premises by pressing the button 1220.

Figure 13:
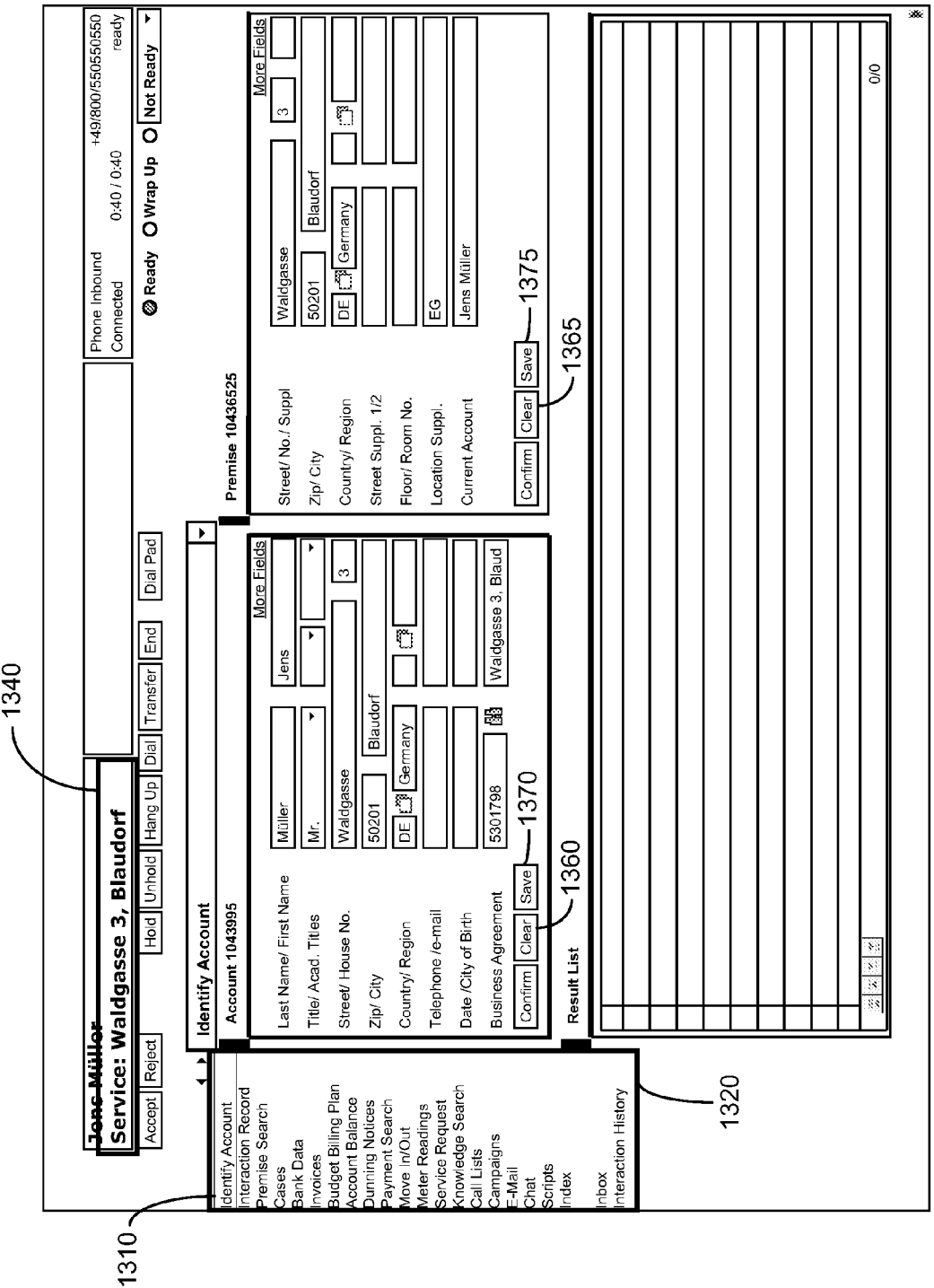

FIG. 13 illustrates ending the identification process. When the agent has confirmed the premises as discussed with respect to FIG. 12, the system displays the premises address prominently in the context area 1340. The premises is also copied to the activity clip board which makes its available for subsequent processes. The system can be configured in such a way that the interaction record is automatically opened once both the account and the premises have been confirmed. A list of available functions that can be performed is displayed in area 1320. The agent can choose one of these menu options depending on the service required by the customer. The agent can click the identified account option 1310 at any time to go back to the current status of the identification process. The agent can make subsequent corrections or changes to the identified objects by clicking the clear buttons 1360 and 1365. The agent can change the fields displayed directly and save the changes by clicking the save buttons 1370 and 1375. Furthermore, the agent can create a new account by clicking the create account button 450 as shown in FIG. 4A.

In this embodiment, each of the premises determined for a particular account are assigned to a contract that is also included in that particular account (in the object oriented database). This is the tying arrangement (or mapping) used to find the relevant premises for a particular account found by the agent (from the caller's information), or to find the relevant account for a particular premises (from the caller's information).

In this embodiment, the searching of premises that are dependent of an account does not break the link between business and technical data, to thereby provide the agent will only the premises that have data identical to the data entered in the search premises field of the display and that are linked to the account that has already been determined. Thus, in the database of information, only premises that are assigned to contracts of the account of interest are included in the premises search results. This allows the searching of premises to allow the call center agent to assign a new address, for example, to a user's account.

Identifying an Account and Changing Account Master Data

Figure 22:
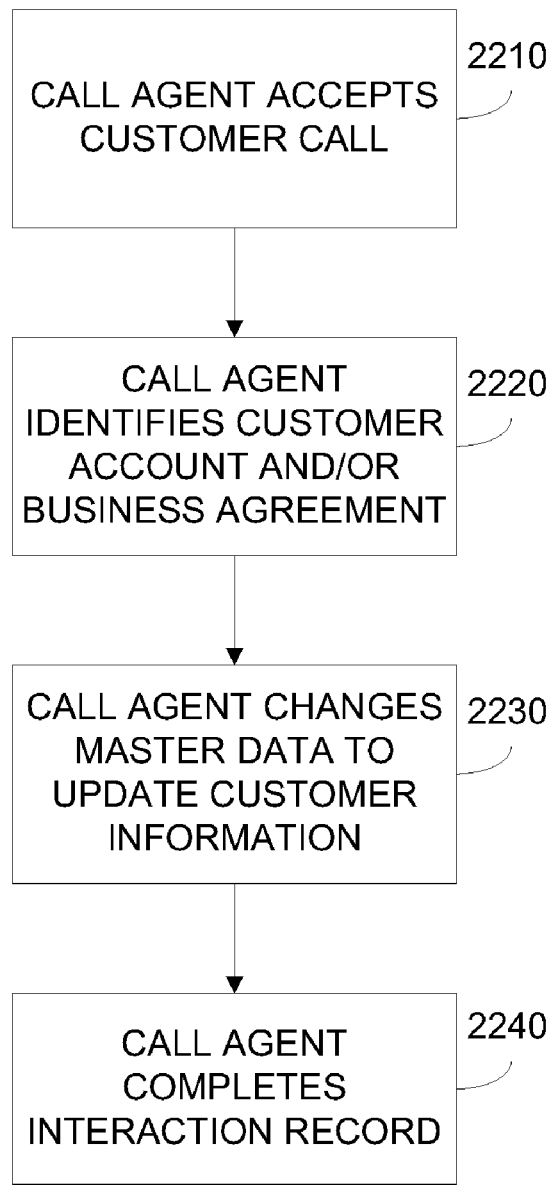
FIG. 22 is a flowchart illustrating the method under a third exemplary embodiment of the present invention.

This feature and method of an exemplary embodiment of the present invention is illustrated using the example described herein of a call agent's interaction with a customer in processing a change of account information, in this case a change in the customer's telephone number. FIG. 22 illustrates a flowchart illustrating the method under this embodiment of the present invention, the details of which are described herein. Step 2210 shows a call agent accepting a customer call. Step 2220 shows a call agent identifying a customer account and/or business agreement. Step 2230 shows a call agent changing master data to update customer account information. Step 2240 shows a call agent completing an interaction record once the customer issue has been addressed and the call has been completed.

This function uses the same method and screen displays as illustrated and described above with respect to FIGS. 1-3, 4B and 5. Then, it proceeds to FIG. 14.

Figure 14:
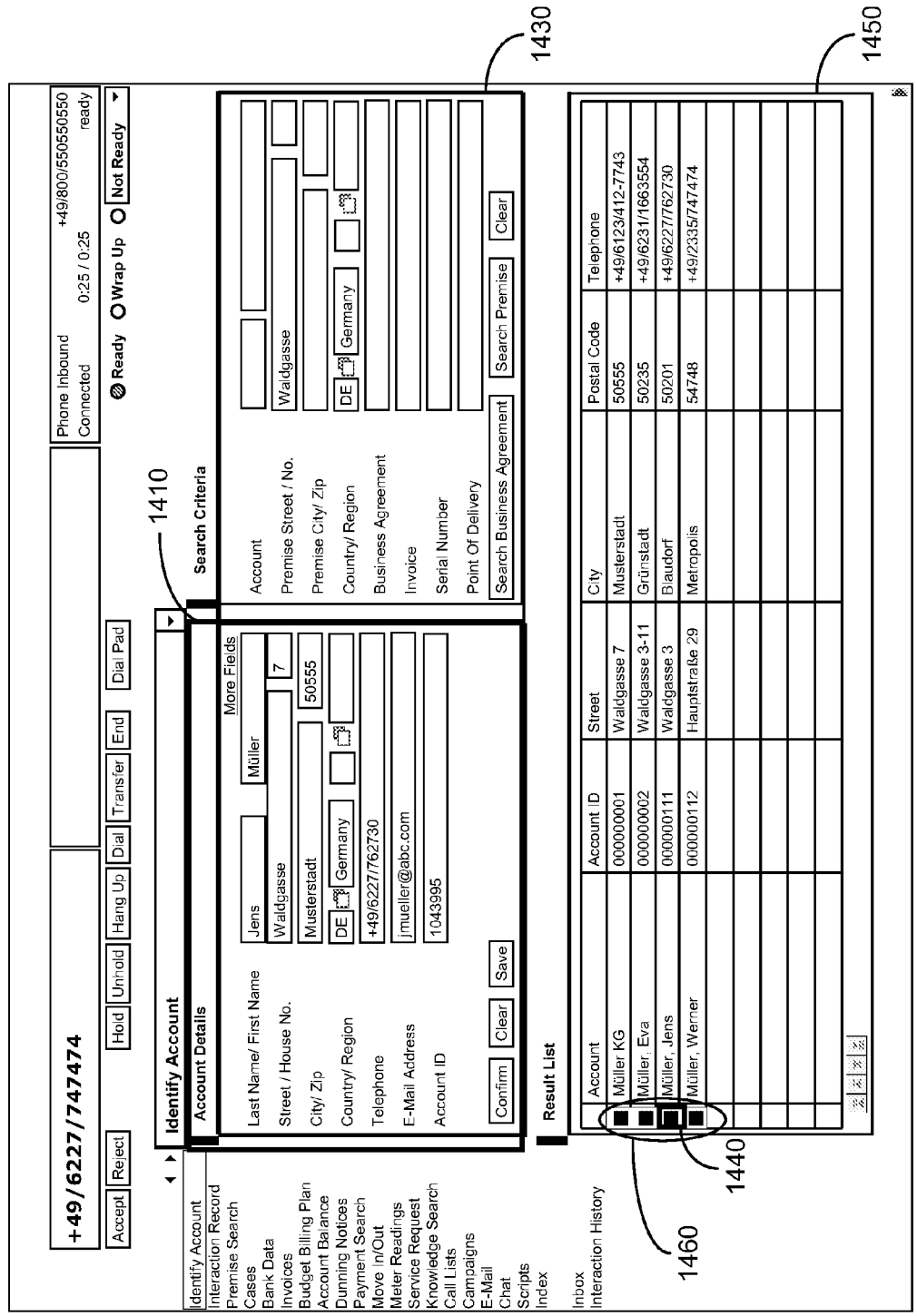

FIG. 14 illustrates a selection of an account from a plurality of accounts displayed in the hit list. The accounts found from the search are displayed in area 1450. Selection boxes 1460 are arranged to correspond to the individual accounts displayed in 1450. To display additional details for one of the accounts found, the interaction center agent can select the relevant box from among the boxes 1460. In this example, the box 1440 has been selected and the relevant information is displayed in account detail area 1410. The agent can select several hits or accounts one after the other in order to identify the actual account for the customer on the basis of the detailed data displayed in area 1410. The search criteria area 1430 is also displayed on the screen for the agent. This allows the agent to search for a premises of the customer related to an account or business agreement.

Figure 15:
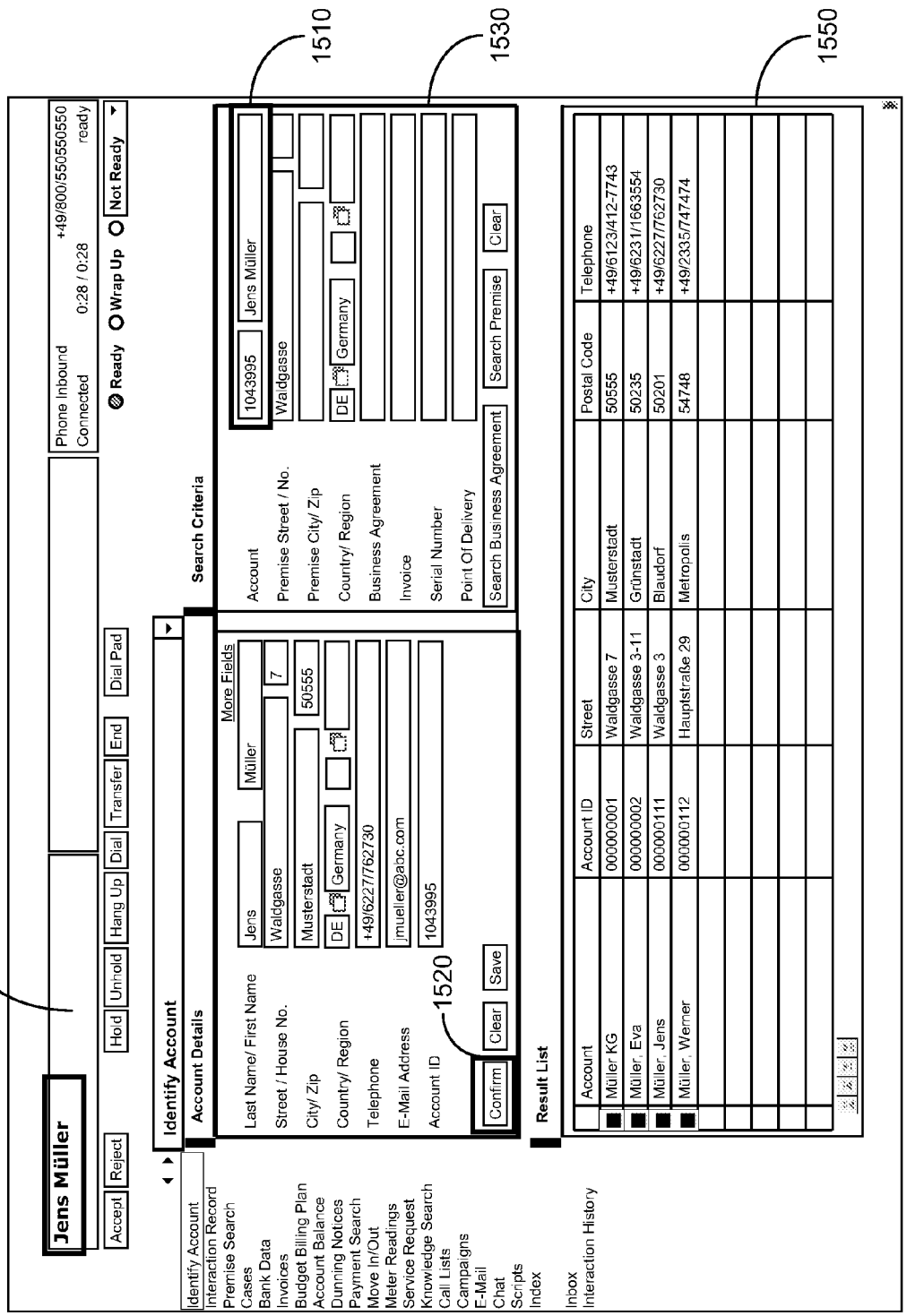

FIG. 15 illustrates confirming a selected account. Once the agent determines that the account selected is the actual account needed for the customer, the agent confirms by pressing the confirm button 1520. In doing so, the account information identifier is displayed in context area 1540. In this case, the name associated with the account is displayed in context area 1540. Also, relevant account information is transferred to the account field 1510 in the search criteria area 1530. This facilitates efficient searching by the agent for business agreements or premises. At the same time, an interaction record is created in the background. The account is also written to the activity clip board, which makes it automatically available for further processing steps.

Figure 16:
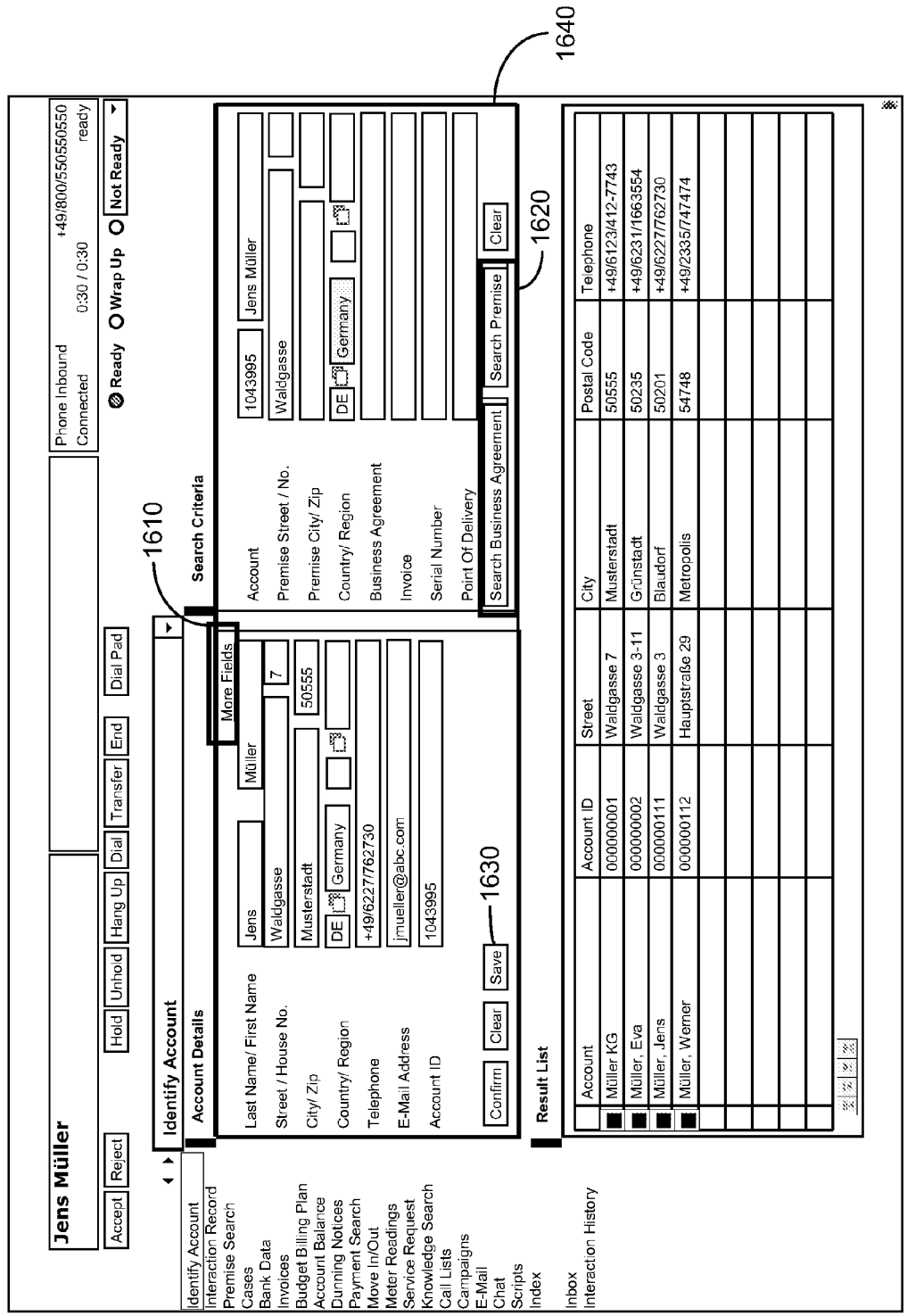

FIG. 16 illustrates navigation to more detailed account information. In this example, the customer has informed the agent that his or her telephone number has changed. At this point, the agent could change the customer's telephone number on the present screen and hit the save button 1630. However, in this example, the agent establishes that it is the telephone of the customer's summer residence, and not the customer's standard telephone number, that is to be changed. The agent, therefore, clicks the more fields link 1610 to navigate to a different screen on which all of the address and communication data for this account is displayed. On this screen of course, the agent could also search for business agreements or premises using button 1620 and the search criteria 1640.

Figure 17:
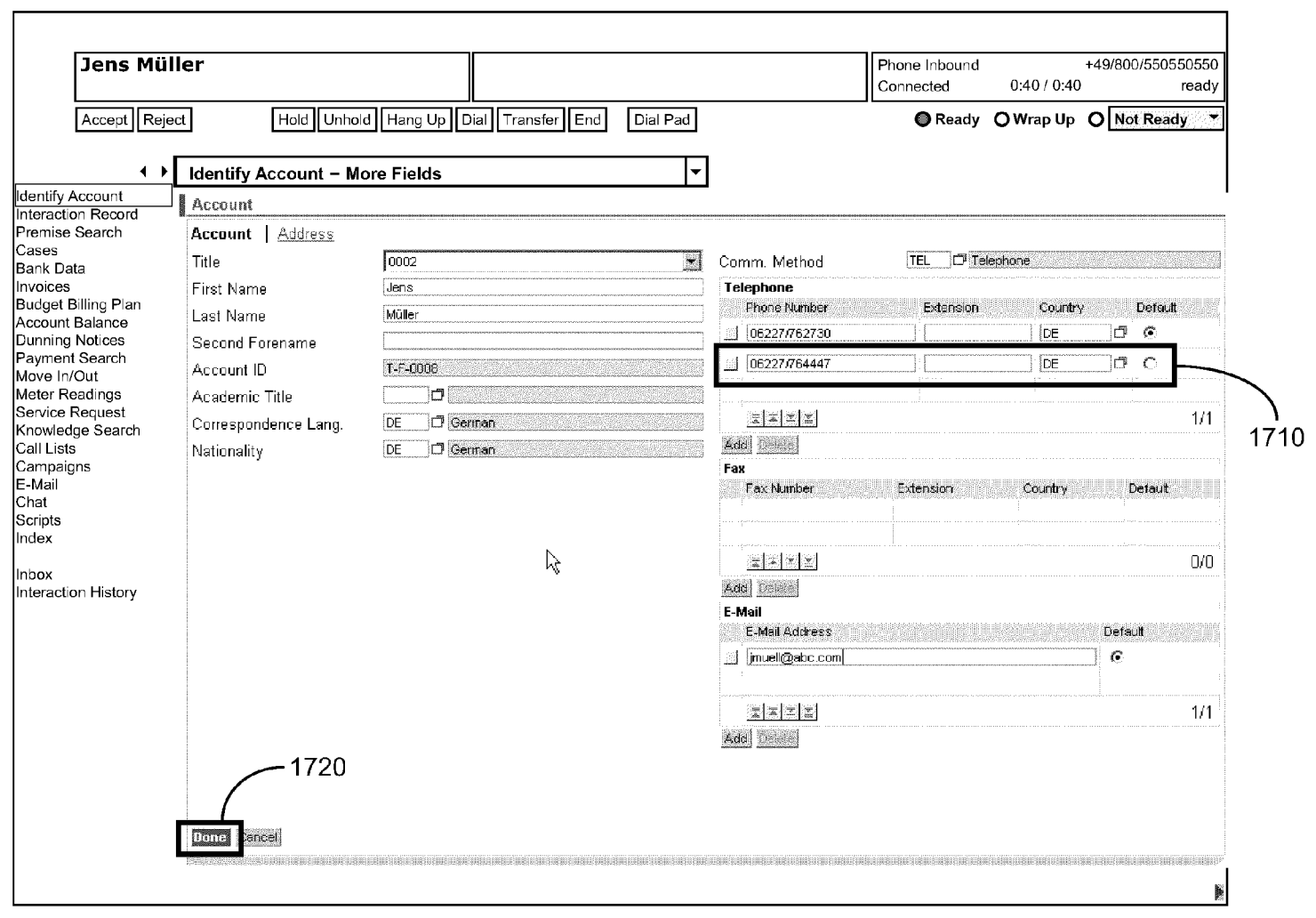

FIG. 17 illustrates a more detailed information screen. In this example, as discussed with respect to FIG. 16, the agent is attempting to change the customer's cellular telephone number. Using the information displayed in FIG. 17, the agent identifies the field 1710 as the customer's cellular telephone number. The agent then proceeds to correct the telephone number based on the conversation with the customer in the field 1710. When finished, the agent clicks the done button 1720. The system then automatically saves the changed data in the data base.

Figure 18:
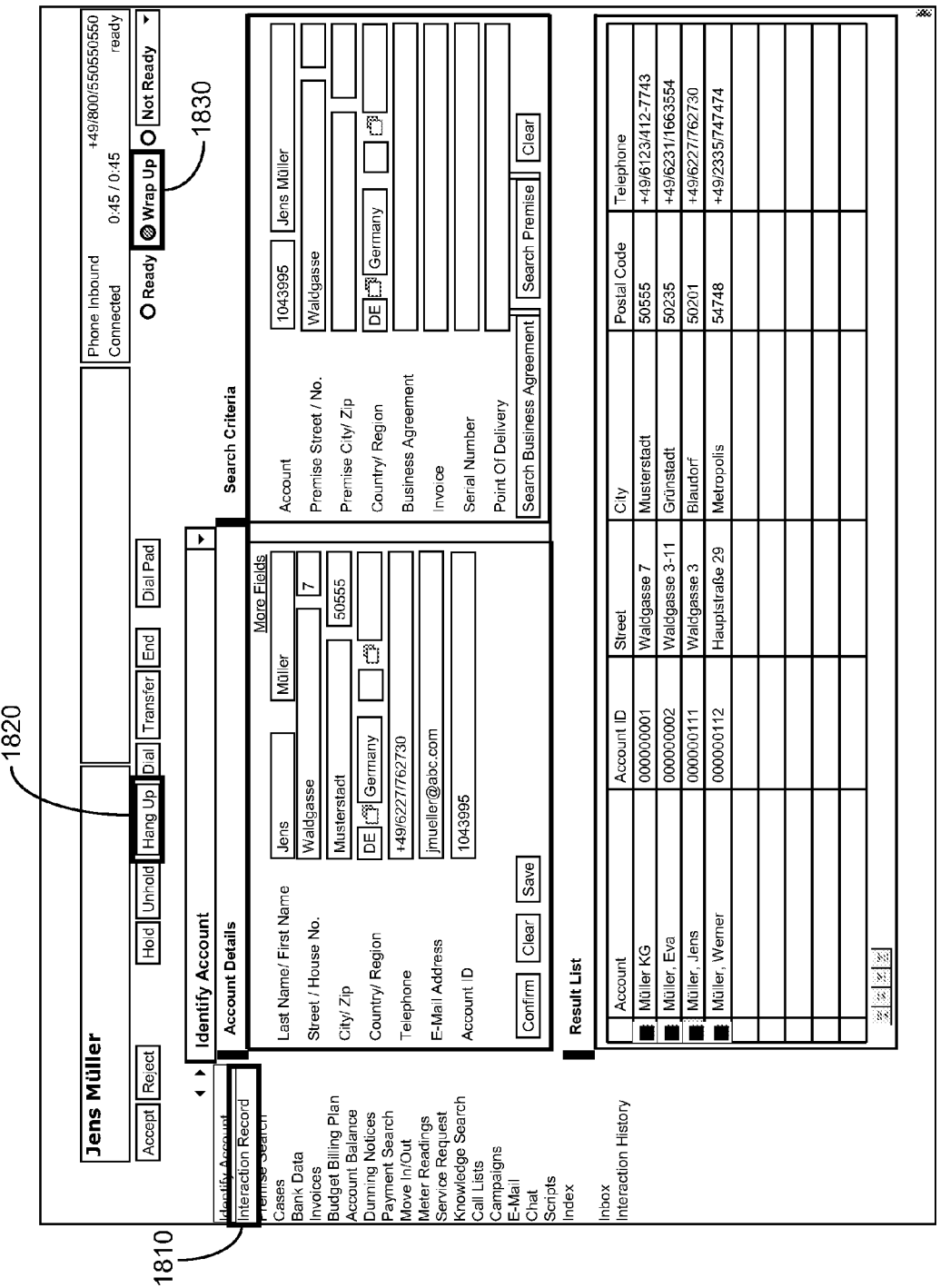

FIG. 18 illustrates the terminating or hanging up procedure for the call. Using the example described with respect to FIGS. 16 and 17, since the customer's request has now been fulfilled, the agent can end the call in a friendly manner. The agent places his system in wrap-up mode by pressing the wrap-up mode radio button 1830. This mode prevents the next call from being received immediately after hanging up from the present call. This gives the agent time to conclude the interaction. Thus the agent presses the hang up button 1820 to end the call. The agent then invokes the interaction record function by pressing the link 1810.

Figure 19:
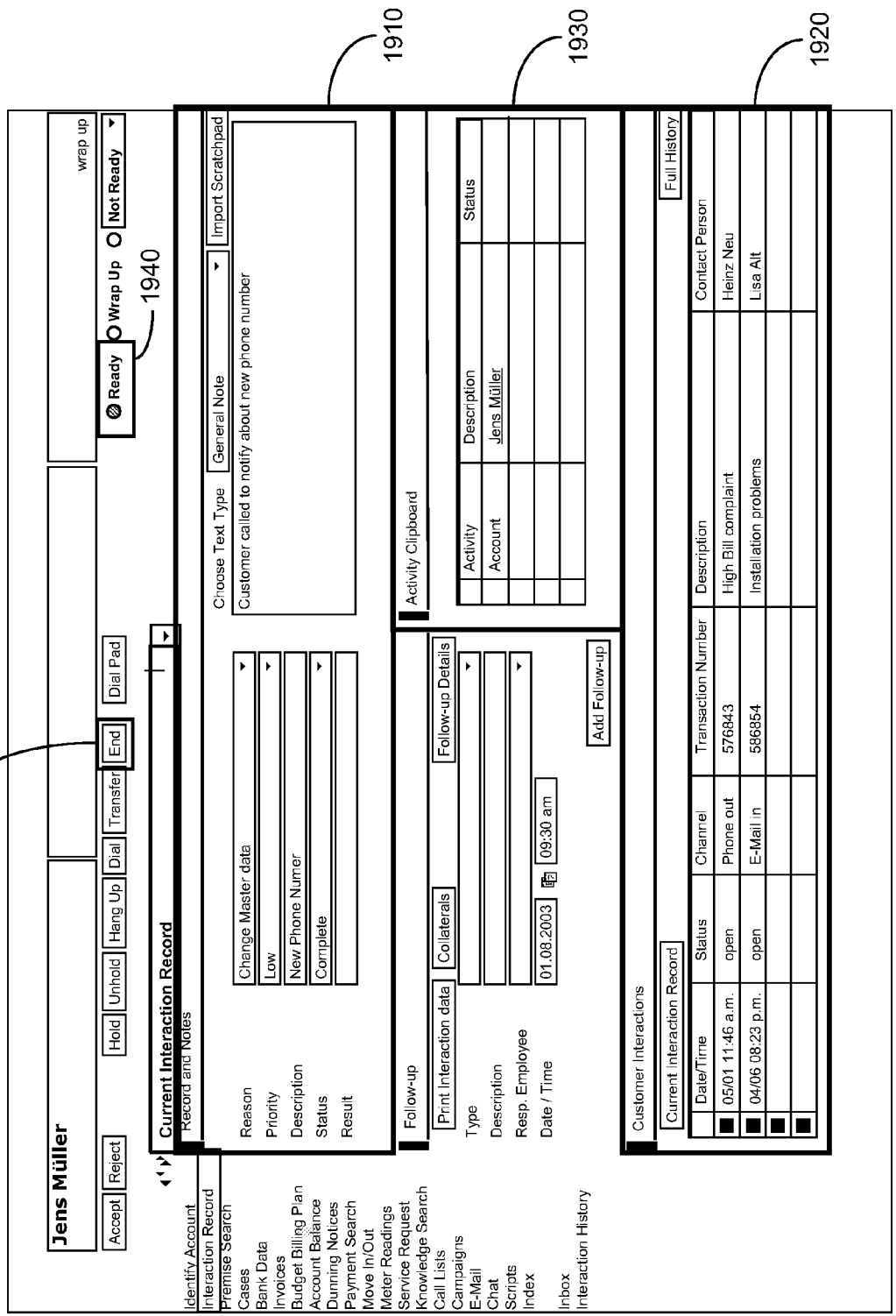

FIG. 19 illustrates an interaction record under an exemplary embodiment of the present invention. At the top of the interaction page illustrated in FIG. 19, the agent logs information about the customer call just concluded. This information is entered in the record and notes area 1910 of the customer interaction record. At the bottom of the page, the last interaction records are displayed as customer history for informational purposes. This information is shown in the customer interactions field 1920. In the activity clip board 1930, all of the objects that played a relevant roll are collected automatically during the interaction. To end the interaction, the agent clicks the end button 1915 and then the ready button 1940 to indicate that the next call can now be accepted. The system automatically saves the interaction record and links the objects from the activity clip board to the interaction record. The system is re-initialized and the agent is automatically taken to the start page.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the present invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. For example, while "premises" information is described as being a type of information that is to be searched in the technical information, other types of technical information instead of premises can be used to search for an account of a caller, such as POD information or connection objects. Also, while "account" information is described as being the type of information that is to be searched in the business information, other types of business information instead of account can be used to search the database, such as business agreements. Also, the search process described in the present embodiments is completely flexible regarding search criteria and sequence, making it very useful for call center operators. The embodiments were chosen and described in order to explain the principals of the present invention and its practical application to enable one skilled in the art to utilize the present invention in various embodiments and with various modifications as are suited to the particular use contemplated.

What is claimed is:

1. A method of modifying customer data in a call center environment, said method comprising:
    completing a connection between a customer and a call agent;
    identifying a customer account or business agreement;
    searching a database for one or more matches pertaining to the identified customer account or business agreement;
    displaying the one or more matches obtained from the database as a hit list;
    receiving user input of a selection of at least one of the matches from the hit list and displaying additional information about the selected at least one match;
    assigning at least one of the matches from the hit list to the identified customer account or business agreement; and
    modifying the additional information for the at least one match based on information provided to the call agent by the customer;
    creating an interaction record as a background process, the interaction record corresponding to the assigning of the at least one of the matches from the hit list to the identified customer account or business agreement; and
    storing the identified account or business agreement, along with the assigned at least one of the matches, onto an activity clip board, wherein the activity clip board includes objects that played a relevant role during the interaction between the customer and the call agent, and wherein the objects included in the activity clip board are linked to the interaction record.

2. A method of modifying customer data in a call center environment according to claim 1, wherein the one or more matches correspond to premises information.

3. A method of modifying customer data in a call center environment according to claim 1, wherein the displaying of the one or more matches comprises displaying one or more premises associated with the customer account or business agreement.

4. A method of modifying customer data in a call center environment according to claim 1, wherein the assigning of at least one of the matches from the hit list to the identified customer account or business agreement occurs after the call agent confirms a particular selection of at least one of the matches from the hit list.

5. A method of modifying customer data in a call center environment according to claim 1, wherein the activity clip board is automatically created.

6. A method of modifying customer data in a call center environment according to claim 1, wherein the additional information comprises at least one of address information, telephone information, email information, and name information.

7. A device comprising:
    a communication interface configured to complete a connection between a customer and a call agent;
    a processor; and
    a computer-readable storage medium including computer-readable instructions stored thereon that, upon execution by the processor, cause the device to:
        identify a customer account or business agreement;
        search a database for one or more matches pertaining to the identified customer account or business agreement;
        display the one or more matches obtained from the database as a hit list;
        receive user input of a selection of at least one of the matches from the hit list and displaying additional information about the selected at least one match;
        assign at least one of the matches from the hit list to the identified customer account or business agreement;
        modify the additional information for the at least one match based on information provided to the call agent by the customer;
        create an interaction record as a background process, the interaction record corresponding to the assigning of the at least one of the matches from the hit list to the identified customer account or business agreement; and
        store the identified account or business agreement, along with the assigned at least one of the matches, onto an activity clip board, wherein the activity clip hoard includes objects that played a relevant role during the interaction between the customer and the call agent, and wherein the objects included in the activity clip hoard are linked to the interaction record.

8. A device according to claim 7, wherein the one or more matches correspond to premises information.

9. A device according to claim 7, wherein the displaying of the one or more matches comprises displaying one or more premises associated with the customer account or business agreement.

10. A device according to claim 7, wherein the assigning of at least one of the matches from the hit list to the identified customer account or business agreement occurs after the call agent confirms a particular selection of at least one of the matches from the hit list.

11. A device according to claim 7, wherein the activity clip board is automatically created.

12. A device according to claim 7, wherein the additional information comprises at least one of address information, telephone information, email information, and name information.

13. An article of manufacture including a computer-readable medium having instructions stored thereon that, if executed by a computing device, cause the computing device to perform operations comprising:
    identifying a customer account or business agreement;
    searching a database for one or more matches pertaining to the identified customer account or business agreement;
    displaying the one or more matches obtained from the database as a hit list;
    receiving user input of a selection of at least one of the matches from the hit list and displaying additional information about the selected at least one match;
    assigning at least one of the matches from the hit list to the identified customer account or business agreement;
    modifying the additional information for the at least one match based on information provided to the call agent by the customer;
    creating an interaction record as a background process, the interaction record corresponding to the assigning of the at least one of the matches from the hit list to the identified customer account or business agreement; and
    storing the identified account or business agreement, along with the assigned at least one of the matches, onto an activity clip board, wherein the activity clip board includes objects that played a relevant role during the interaction between the customer and the call agent, and wherein the objects included in the activity clip board are linked to the interaction record.

14. An article of manufacture according to claim 13, wherein the one or more matches correspond to premises information.

15. An article of manufacture according to claim 13, wherein the displaying of the one or more matches comprises displaying one or more premises associated with the customer account or business agreement.

16. An article of manufacture according to claim 13, wherein the assigning of at least one of the matches from the hit list to the identified customer account or business agreement occurs after the call agent confirms a particular selection of at least one of the matches from the hit list.

17. An article of manufacture according to claim 13, wherein the activity clip board is automatically created.

18. An article of manufacture according to claim 13, wherein the additional information comprises at least one of address information, telephone information, email information, and name information.

19. A system comprising:
a database; and
a device comprising:
   a communication interface configured to complete a connection between a customer and a call agent;
   a processor; and
   a computer-readable storage medium including computer-readable instructions stored thereon that, upon execution by the processor, cause the device to:
   identify a customer account or business agreement;
   search the database for one or more matches pertaining to the identified customer account or business agreement;
   display the one or more matches obtained from the database as a hit list;
   receive user input of a selection of at least one of the matches from the hit list and displaying additional information about the selected at least one match;
   assign at least one of the matches from the hit list to the identified customer account or business agreement;
   modify the additional information for the at least one match based on information provided to the call agent by the customer;
   create an interaction record as a background process, the interaction record corresponding to the assigning of the at least one of the matches from the hit list to the identified customer account or business agreement; and
   store the identified account or business agreement, along with the assigned at least one of the matches, onto an activity clip board, wherein the activity clip board includes objects that played a relevant role during the interaction between the customer and the call agent, and wherein the objects included in the activity clip board are linked to the interaction record.

20. A system according to claim 19, wherein the one or more matches correspond to premises information.

21. A system according to claim 19, wherein the displaying of the one or more matches comprises displaying one or more premises associated with the customer account or business agreement.

22. A system according to claim 19, wherein the assigning of at least one of the matches from the hit list to the identified customer account or business agreement occurs after the call agent confirms a particular selection of at least one of the matches from the hit list.

23. A system according to claim 19, wherein the activity clip board is automatically created.

24. A system according to claim 19, wherein the additional information comprises at least one of address information, telephone information, email information, and name information.

* * * * *